United States Patent [19]
McClure

[11] Patent Number: 5,563,496
[45] Date of Patent: Oct. 8, 1996

[54] BATTERY MONITORING AND CHARGING CONTROL UNIT

[75] Inventor: Malcolm S. McClure, Indianapolis, Ind.

[73] Assignee: Span, Inc., Indianapolis, Ind.

[21] Appl. No.: 306,121

[22] Filed: Sep. 14, 1994

Related U.S. Application Data

[63] Continuation-in-part of Ser. No. 690,203, Apr. 23, 1991, Pat. No. 5,349,282, which is a continuation-in-part of Ser. No. 625,346, Dec. 11, 1990, Pat. No. 5,198,743.

[51] Int. Cl.$^6$ .................................. H02J 7/04; H02J 7/16
[52] U.S. Cl. .................. 320/48; 320/30; 320/35; 320/32; 424/427
[58] Field of Search .................. 320/31, 32, 22–24, 320/37–40, 43, 44, 48; 324/426–7, 433

[56] References Cited

U.S. PATENT DOCUMENTS

| | | | |
|---|---|---|---|
| 4,709,202 | 11/1987 | Koenck et al. | 320/43 |
| 4,965,738 | 10/1990 | Bauer et al. | 364/483 |
| 5,043,651 | 8/1991 | Tamura | 320/43 |
| 5,166,595 | 11/1992 | Leverich | 320/32 |
| 5,304,916 | 4/1994 | Le et al. | 320/23 |
| 5,304,917 | 4/1994 | Somerville | 320/32 |
| 5,357,203 | 10/1994 | Landau et al. | 324/427 |
| 5,455,499 | 10/1995 | Uskali et al. | 320/43 |
| 5,459,671 | 10/1995 | Duley | 364/483 |

Primary Examiner—Peter S. Wong
Assistant Examiner—Gregory Toatley
Attorney, Agent, or Firm—Haynes and Boone, L.L.P.

[57] ABSTRACT

A unit that can be a tiny module within a battery pack includes a microprocessor operating through onboard sensors and read circuitry to monitor battery current, voltage and temperature and to develop fast charge termination control data. Various termination schemes are available including negative delta V, dT/dt, dV/dt, absolute temperature, absolute voltage, and override timer. The microprocessor also operates to develop state of charge, percentage of capacity charge and other status data, to store such data along with setup and calibration data, in an EEPROM, to report data to a host periodically or when polled to and to operate automatically or at a user's request to initially perform and update a calibration as to actual battery capacity. During times when the pack is idle, the unit automatically reverts to a low-power mode in which measuring circuitry is deenergized but during such times, it operates periodically to compensate for self-discharge as a function of temperature. In the read circuitry, a ramp generator generates a linear ramp voltage that is compared with voltages proportional to battery voltage, supply voltage, battery current and temperature, using comparators connected to pins of a common port of the microprocessor and using a mask to obtain all readings from a single generation of the ramp. Voltage dividers of the read circuitry are so arranged as to permit accurate readings of current in either direction and to operate in a bridge configuration to obtain normalized measurements independent of ramp slope. Dynamic correction of readings and other features are also provided.

47 Claims, 8 Drawing Sheets

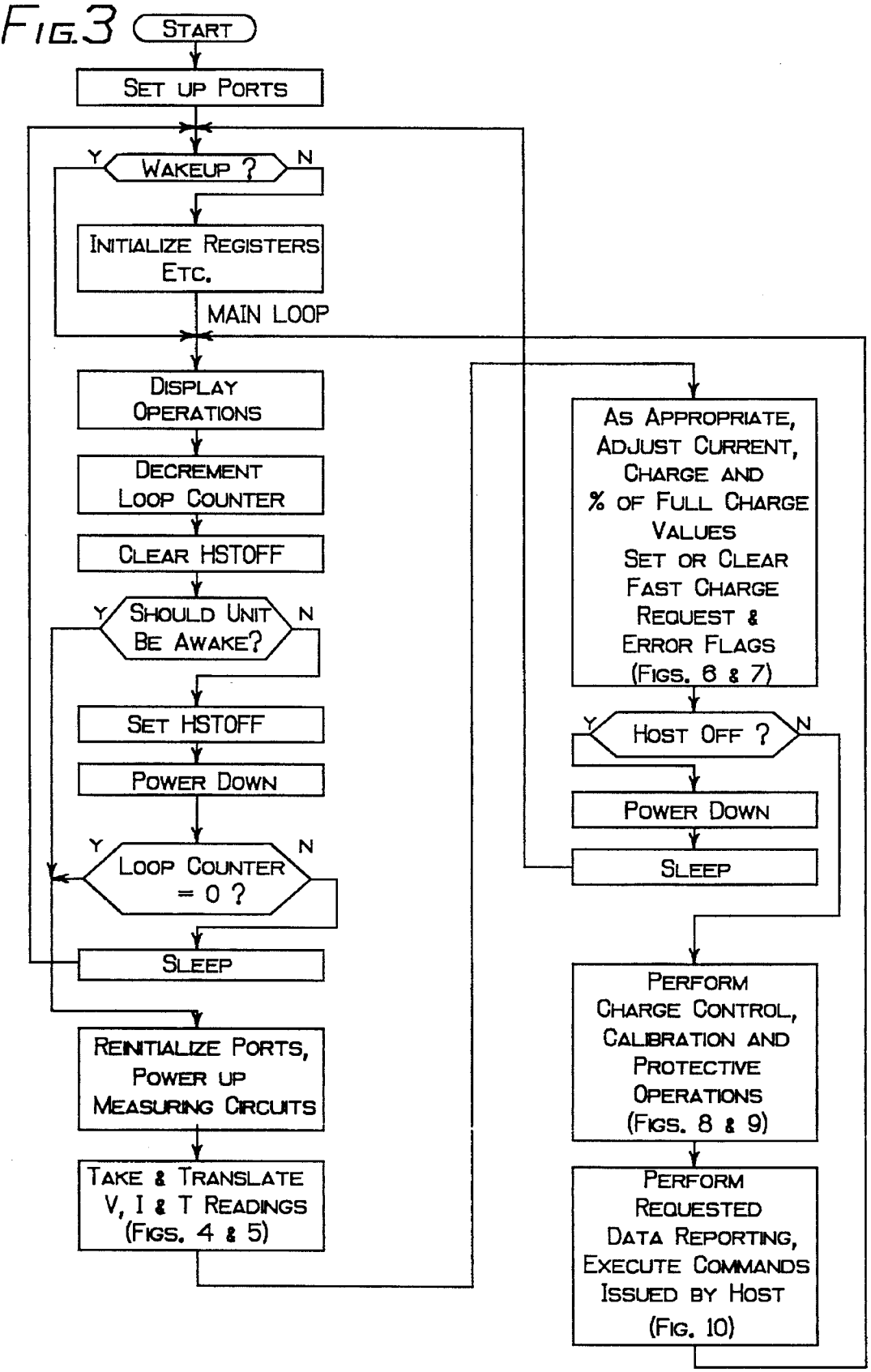

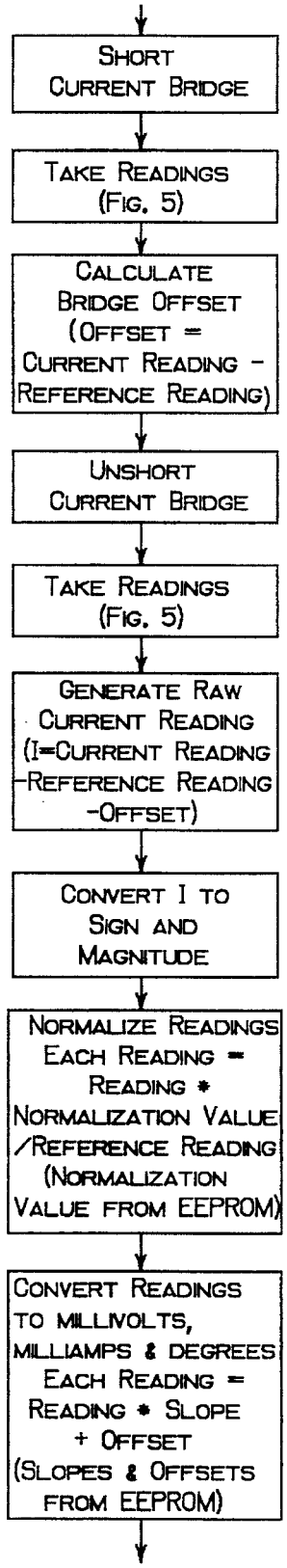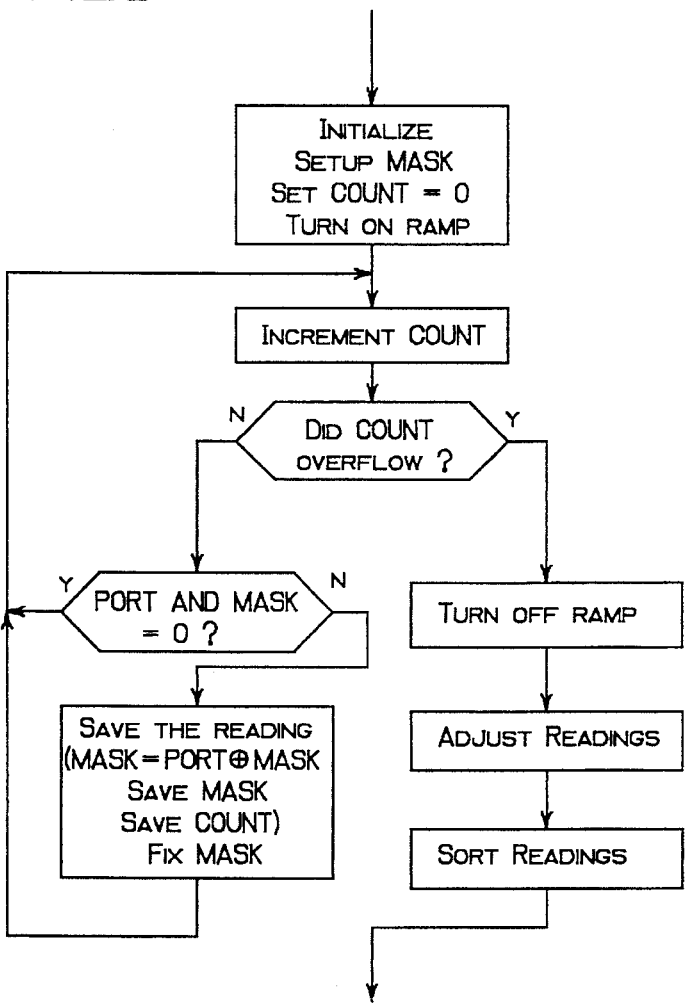

BATTERY MONITORING AND CHARGING CONTROL UNIT

REFERENCE TO RELATED APPLICATION

This application is a continuation-in-part of my application Ser. No. 07/690,203, filed Apr. 23, 1991, entitled "BATTERY CHARGING AND MONITORING SYSTEM", issued Sep. 20, 1994 as U.S. Pat. No. 5,349,282. Said application is a continuation-in-part of an application of Malcolm Stuart McClure and Phong Binh Chau entitled "BATTERY CHARGER WITH MICROPROCESSOR CONTROL", Ser. No. 07/625,346, filed Dec. 11, 1990, and issued Mar. 30, 1993 as U.S. Pat. No. 5,198,743. The disclosures of said application are incorporated by reference.

BACKGROUND OF THE INVENTION

1. Field of the Invention

This invention relates to the use of rechargeable batteries for supply of electrical power. A unit is provided which is highly efficient and which provides accurate and reliable control and indications, while using a small number of component parts and being otherwise readily and economically manufacturable. The unit of the invention is compact and is such that it can be readily included, if desired, as an integral part of battery packs used for supplying power to hosts such as lap-top computers and other types of portable equipment. The unit is adapted for control by a host and for reporting state of charge and other data to a host and it is highly versatile, being readily programmable to meet the requirements and desires of a user.

2. Background of the Prior Art

As described in the introductory portions of the aforementioned applications, the Baker et al. U.S. Pat. Nos. 4,746,854 and 4,918,368 contain reviews of citations of the prior art and disclose battery chargers having a number of advantageous features, including a method and arrangement for accurate detection of a peak charge condition and monitoring of current flow to and from a battery to establish the present state of charge thereof.

SUMMARY OF THE INVENTION

This invention was evolved with the general object of providing improvements upon and extensions of the inventions of the Baker et al. patents and of the aforementioned applications, particularly with respect to reducing manufacturing costs while obtaining safe and reliable charging of a battery to its capacity and while facilitating accurate control by and reporting of data to a host, and also with respect to providing a unit which is usable with a variety of hosts and a variety of types of batteries.

Important aspects of the invention relate to the incorporation of a battery monitoring and charge control unit as an integral part of a battery pack so as to obtain the advantages to be obtained therefrom, as recognized in the aforementioned applications. More specific objects of the invention relate to providing a unit which is small in size and weight with low power consumption and to providing other features such that it can be incorporated in a battery pack for control and monitoring of charge and discharge of a battery of the pack.

In accordance with the invention, a battery charge control and monitoring unit is provided which is preferably in the physical form of a tiny module that fits within a battery pack containing a battery which may be connected to a load provided by the circuit of a host. A charger which is controlled by the unit of the invention may be part of a host or may be physically separate therefrom. The host may be a portable computer, for example, but may be any of a wide variety of battery powered devices.

An illustrated embodiment of a unit of the invention includes a microprocessor connected to a memory which stores operating data and data to be reported to a host. The memory may be a non-volatile but modifiable memory such as a EEPROM memory, for example. Onboard sensors monitor battery current, voltage and temperature and use this information to keep accurate track of the amount of charge remaining in a battery being monitored. A host can either poll the unit for this information or specify that it be sent periodically. Another important feature is that the unit has the ability to calibrate itself to the actual battery capacity and periodically update this value as the battery ages.

Additionally, the unit acts as a charge control unit by specifying when charge current should be applied by a charger to the battery. Various charge termination schemes are available including negative delta V, dT/dt, dV/dt, absolute temperature, absolute voltage, and override timer.

Another important feature is that the unit automatically reverts to a low-power mode when it senses that the battery is idle, thereby eliminating any significant load on the battery. It does, however, compensate for self-discharge as a function of temperature during this time. A further feature is that the unit allows a user to configure various parameters and to prevent loss of calibration when the energy in a battery is depleted.

Important features relate to analog to digital conversion. Circuitry is preferably used which is similar to that disclosed in the aforementioned prior applications and which operates by developing a measurement count of time intervals of fixed duration from the time generation of a ramp voltage is generated to a time at which a signal is developed by comparison of the ramp voltage and a voltage which is a function of a voltage, current or other unknown to be measured. One feature relates to the use of a transistor which is controlled to provide a source of a constant current for a ramp capacitor, so as to obtain a ramp voltage which is a linear function of time. No look-up tables or algorithms are required to compensate for non-linearities in the ramp voltage, minimizing burden on the processor.

Another feature relates to the discovery that even with generation of a linear ramp during each measurement, there still may be variations in ramp slope over a period of time, as from changes in temperature affecting the transistor of the constant current source. A normalization operation is performed in accordance with this feature in which the ramp voltage is compared with a regulated voltage to develop a reference count. The reference count so developed is a function of the ramp slope and through a comparison with the measurement count, a normalized measurement is obtained which is substantially independent of ramp slope.

In accordance with a dynamic correction feature related to the normalization feature, a calibration process is performed, at a time of manufacture for example, in which an initial reference reading is developed and stored for comparison with the reference reading obtained in each subsequent measurement and for use in adjusting a final output reading.

The initial reference reading so obtained may be stored in the aforementioned EEPROM of an illustrated embodiment and in accordance with further features of the invention, other calibration constants are determined and stored and a unit can be readily customized as desired. As a result of these features and features related to analog to digital conversion, it is possible to achieve highly accurate measurements with a high degree of reliability and without using expensive resistors and other components having close tolerances.

Another specific feature of the analog to digital conversion circuitry relates to the measurement of current through the use of a voltage divider between a source of supply voltage and a current sense point separated from ground by a current sense resistor. A tap on the divider linearly tracks the drop across the sense resistor but is always of one polarity, a positive polarity in the illustrated embodiment. This feature is important in permitting measurement of both charge and discharge currents and may be applied to any measuring operation in which currents or voltages of either polarity need to be measured.

Measuring accuracy is increased by configuring the current measuring divider as one side of a bridge circuit having an opposite side formed by a reference divider connected between the supply voltage source and ground. In addition, zeroing means are provided to provide a reference condition in which the voltage at the measurement node of the measuring divider is substantially independent of the voltage being measured across the current sense resistor.

Further specific features of the analog to digital conversion circuitry relate to the provision of shorting means which form the aforementioned zeroing means in a manner such as to permit accurate determination of any unbalance of the bridge circuit formed by the measuring and reference dividers.

Still further features of the circuitry relate to reduction in power consumption by energizing circuitry only when necessary.

Additional features relate to processor control. Some relate to the operation of the ramp generator and the processing of signals developed by measurement and reference comparators supplied with the ramp voltage. Through the use of a mask and other features, the time required to make measurements and the number of required components are minimized without sacrifice in accuracy or reliability.

Other processor control features relate to numerical integration of current measurements and determination of state of battery charge and charge efficiency. The effects of temperature variations during charging operations as well as when the battery is idle and the effects of state of charge on charge efficiency are taken into account in a manner such as to obtain highly accurate data as to state of charge and to permit accurate measurement of battery capacity.

Still further processor control features relate to accurate and reliable determination of the state of charge of batteries of different types, particularly NICAD and NIMH batteries, and to the provision of safeguards which prevent overcharging or excessive discharging of a battery being monitored and controlled.

Processor control and display means are so provided as to provide reporting of battery information to a host and ready control, adjustment and customization of a unit by a user, also providing visual information as to the state of charge of a battery.

This invention contemplates other objects, features and advantages which will become more fully apparent from the following detailed description taken in conjunction with the accompanying drawings.

BRIEF DESCRIPTION OF THE DRAWINGS

FIG. 3 is a flow diagram illustrating the overall operation of the unit of FIG. 1;

FIG. 4 is a flow diagram illustrating certain operations relating to the taking and translating of voltage, current and temperature readings;

FIG. 5 is a flow diagram illustrating in detail the manner of using of a mask in the taking of and processing of readings developed from a ramp generator;

DESCRIPTION OF PREFERRED EMBODIMENTS

Figure 1:
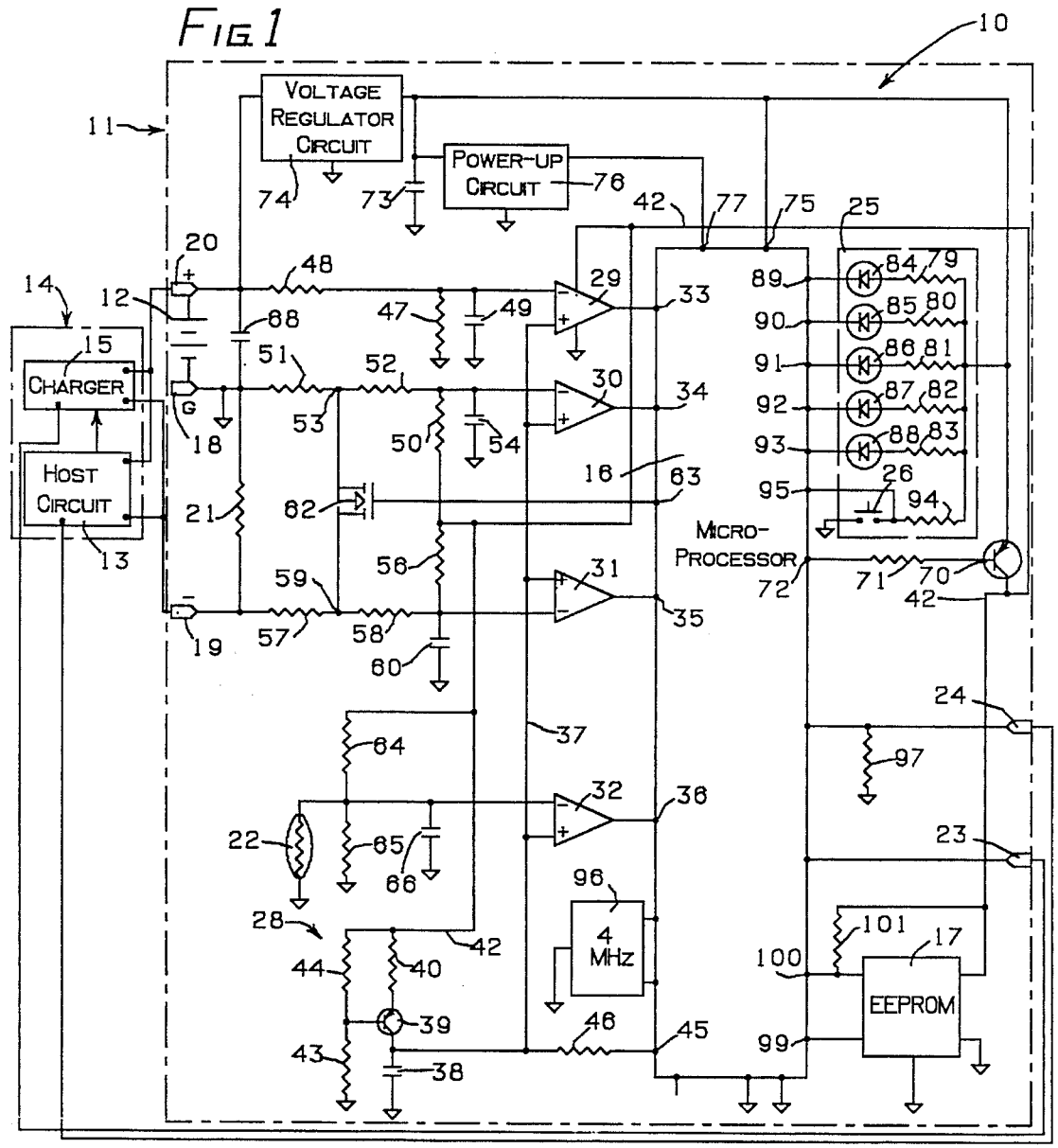
FIG. 1 diagrammatically illustrates a battery monitoring and charger control unit constructed in accordance with the invention and shown connected to a host.

Reference numeral 10 generally designates a battery charge control and monitoring unit which is constructed in accordance with the principles of this invention. It is preferably in the physical form of a tiny module that fits within a battery pack 11 which includes a battery 12 and which may be connected to a load provided by the circuit 13 of a host 14. The host 14 may be a portable computer, for example, and may include a charger 15 which is controllable by the charge control and monitoring unit 10 of the invention, either directly or through the host circuit 13. The charger 15 may be physically separate from the host circuit 13, if desired.

The unit 10 includes a microprocessor 16 which may, for example, be a type 16C57XT processor. It is connected to an EEPROM memory 17 and to onboard sensors which monitor battery current, voltage and temperature, and use this information to keep accurate track of the amount of charge remaining in the pack 11. The host 14 can either poll the energy gauge for this information or specify that it be sent periodically. The unit 10 has the ability to calibrate itself to the actual battery pack capacity and periodically update this value as the pack 11 ages.

Additionally, the unit 10 acts as a charge control unit by specifying when charge current should be applied by the charger 15 to the battery 12 of the pack 11. Various charge termination schemes may be used including negative delta V, dT/dt, dV/dt, absolute temperature, absolute voltage, and override timer.

The unit 10 automatically reverts to a low-power mode when it senses that the pack 11 is idle, thereby eliminating any significant load on the battery 12. It does, however, compensate for self-discharge as a function of temperature during this time. As will also be described, the unit 10 allows a user to configure various parameters and to prevent loss of calibration when the energy in a pack 11 is depleted.

Unit 10 includes a ground terminal 18 and minus and plus terminals 19 and 20 for connection to load and charger circuits of a host, the battery 12 being connected between the ground terminal 18 and the plus terminal 20. Current to and from the battery 12 is monitored by measuring the voltage across a current sensing resistor 21 connected between the minus terminal 19 and the ground terminal 18. Temperature is monitored by means of a thermistor 22 which must be located in proximity to the battery 12 and which is so located when the unit 10 is in the form of a module installed in a battery pack 11. It will be understood that portions of the unit 10 other than the thermistor 22 may be located at a position away from a battery being monitored and controlled, using connecting wires between such portions of the unit 10 and the thermistor 22 located in proximity to the battery.

A charge control terminal 23 is provided for supplying a charger control signal to the charger 15 and a data terminal 24 is provided which is usable for bi-directional serial transmission of data, for receiving digital data from the host circuit 13 to control the mode of operation of the unit 10 and for sending data to report state of charge and other data to the host circuit 13. If desired, the host circuit 13 may respond to data sent thereto through the data terminal 24 to control of the charger 15, rather than or in addition to having the charger controlled from the charger control terminal 23. An LED display board 25 is provided in the unit 10 for indicating the approximate state of charge when a push button switch 26 is closed.

For performing analog to digital conversions, a ramp voltage generator 28 is controlled by the microprocessor 16 to supply a ramp voltage to plus inputs of four comparators 29, 30, 31 and 32. Comparator 29 is used in monitoring battery voltage; comparator 30 is used in monitoring a regulated supply voltage and in developing reference readings used to obtain improved accuracy; comparator 31 is used in monitoring current flowing to and from the battery 12; and comparator 32 is connected to the thermistor 22 to monitor battery temperature.

The microprocessor 16 initiates operation of the ramp voltage generator 28 and then counts time intervals of substantially fixed duration while monitoring signals at four pins 33, 34, 35 and 36 thereof which are connected to outputs of the four comparators 29, 30, 31 and 32. Each comparator operates to develop a "high" signal at its output when the voltage applied to its minus input is exceeded by the ramp voltage which is applied through a line 37 to its plus input. When the microprocessor 16 detects a "high" signal at one of the pins 33–36, the count then registered provides an initial reading of the magnitude of the voltage at the minus input of the corresponding comparator. Important features of the invention relate to the processing of such initial readings so obtained in a manner such as to produce highly accurate final output readings of voltage, current and temperature while using relatively inexpensive circuit components and achieving other advantages, as hereinafter shown and described.

Specific features of the invention relate to the the construction of ramp generator 28. The ramp voltage is developed at the line 37 which is connected to the plus inputs of comparators 29–32 and which is connected through a ramp capacitor 38 to ground. To charge the capacitor 38, the line 37 is connected to collector of a PNP transistor 39 the emitter of which is connected through a resistor 40 to a voltage supply line 42. The base of transistor 39 is connected through a resistor 43 to ground and through a resistor 44 to the voltage supply line 42. Initiation of generation of a ramp voltage is controlled from a single pin 45 of the microprocessor 16 which is directly connected through a resistor 46 to the line 37 and the ungrounded terminal of capacitor 38.

In operation, pin 45 is brought to a low state to discharge the capacitor 38, series resistor 46 being operative to limit discharge current and protect the output circuitry of the microprocessor 16. Then the capacitor 38 is charged through the transistor 39 which operates as a source of constant current. As a result, the slope of the ramp voltage is constant during each generation thereof and the count readings obtained have a linear relationship to the voltages applied to the respective minus inputs of the comparators 29–32. The arrangement avoids the burden on the microprocessor 16 and its memory which would result from use of algorithms and/or look-up tables and processing steps to compensate for non-linearities in the ramp voltage.

The comparator 29 is used in comparing the ramp voltage on line 37 with a voltage proportional to battery voltage, its minus input being connected to a node of voltage divider connected through a resistor 47 to ground and through a resistor 48 to the terminal 20 and plus terminal of battery 12. The values of the resistors 47 and 48 are preferably such as to develop a voltage at the minus input of comparator 29 which is at approximately in the middle of the range of the ramp voltage. By way of example, they may have values of 62K and 1M. A capacitor 49 is connected across the resistor 47 to stabilize the voltage at the minus input of comparator 29 with respect to transient noise signals and the like.

With a stable and accurately generated ramp voltage, an accurate indication of the magnitude of the battery voltage is obtained from the count registered when the voltage at the minus input of comparator 29 exceeds the ramp voltage. It has been found, however, that there can be errors and in further investigation, it is found that such errors are not caused to any substantial extent from changes in supply voltage or values of resistors but result primarily from changes in the slope of the ramp voltage. Apparently, the slope is maintained constant and stable by the transistor 39 during each measuring operation but can change over a period of time due to temperature variations or otherwise.

It is found, in addition, that compensation for such slope changes can be obtained through the operation of the comparator 30 which compares the ramp voltage with a substantially constant reference voltage from a node of a reference voltage divider. Since the slope is constant in each measuring operation but subject to variations, the count developed when the ramp voltage exceeds the reference voltage provides an accurate indication of the slope of the ramp voltage and it provides a reference reading inversely proportional to ramp slope. An upper leg of the reference voltage divider is formed by a resistor 50 between a reference node at the minus input of comparator 30 and the voltage supply line 42. A lower leg is formed by two resistors 51 and 52 which are connected in series between the reference node and ground and which provide an additional node 53 which is used for purposes related to the measurement of current in the manner as hereinafter described. A stabilizing capacitor 54 is connected between the reference node and ground.

In each measuring operation, a battery voltage measurement reading obtained from use of comparator 29 is compared with a reference reading obtained from use of comparator 30 to develop a final output reading of battery voltage, the reference reading being a measurement of ramp slope. Accordingly, battery voltage measurement data can be obtained which is substantially independent of changes in slope of the ramp voltage.

To insure the accuracy of data that provides a final output reading of battery voltage, a calibration process is performed, at a time of manufacture for example, in which the data of a reference reading required for accurate measurement is stored as a calibration reading in a memory which is provided by the EEPROM 17 in the illustrated embodiment. Then in each periodically performed measurement operation, a normalization procedure is performed in which the measurement reading obtained using the comparator 29 is multiplied by the ratio of the stored calibration reading to the reference reading obtained using the comparator 30.

Important features of the invention relate to the measurement of current, using the current sense resistor 21 which is in series between the terminal 19 and the ground terminal 18, a voltage being developed at the terminal 19 which is proportional to any charge or discharge current and which is positive relative to ground when the current is in a discharge direction but which is negative relative to ground when the current is in a charge direction. This poses a problem when an analog to digital converter is used which can measure voltages of only one polarity, it being noted that with the converter of the illustrated embodiment, voltages which are negative relative to ground cannot be measured through comparison with a ramp voltage which is always positive.

To alleviate this problem, a voltage divider is established between the voltage supply line 42 and the terminal 19 to establish a battery current measurement node that is connected to the minus input of comparator 31 and that is at a voltage which is always positive relative to ground but which increases above a zero battery current value when the terminal 19 goes positive and decreases from the zero battery current value when the terminal 19 goes negative. An upper leg of the voltage divider is formed by a resistor 56 between the battery current measurement node and the voltage supply line 42. A lower leg is formed by two resistors 57 and 58 connected in series between the battery current measurement node and ground, an additional node 59 being provided at the junction between resistors 57 and 58. A stabilizing capacitor 60 is connected between ground and the battery current measurement node.

To establish the value of a voltage at the battery current measurement node at which battery current is zero, zero input means are operative when in an active condition to simulate a zero battery current condition at which the voltage across the current sense resistor 21 is zero. A temporary direct short might be provided across the resistor 21 but since the value of resistor 21 is desirably very low, for example 0.025 ohms, there is a problem in that a direct short would require switching in of a resistance having an extremely low value. This problem is overcome with the circuit of the illustrated embodiment in which the resistor 57 has a value which is much greater than that of the current sense resistor 21, but which is a small fraction of the total resistance of resistors 57 and 58. Zero input means are connected to the node 59 and operate in active condition to provide a relatively low resistance connection thereto for developing a voltage at the node 59 which is substantially independent of measured current, thereby simulating a zero battery current condition. In the embodiment of FIG. 1, the zero input means includes a transistor 62 which may preferably be a low resistance MOSFET transistor and which is controlled from a pin 63 of the microprocessor 16 and connected between the zeroing node 59 and the node 53 of the reference divider circuit which cooperates with the battery current measuring divider circuit in providing a bridge circuit. When the pin 63 is brought high, the transistor 62 is rendered conductive to obtain a relatively low resistance connection between the nodes 53 and 59. Since the resistance 21 has a very low value, any voltage developed thereacross is negligible in relation to voltages developed across the resistors 51 and 57 which have much higher values. Both of the voltage dividers of the bridge circuit, i.e. the reference divider formed by resistors 50, 51 and 52 and the current measuring divider formed by the resistors 56, 57 and 58 are then placed in essentially the same condition, and any unbalance of the bridge circuit can be determined.

Figure 2:
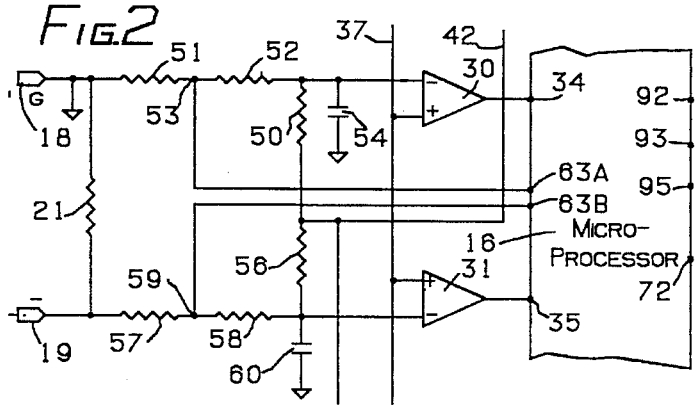
FIG. 2 is a schematic circuit diagram of a modified portion of circuitry of the unit illustrated in FIG. 1.

FIG. 2 illustrates a modification in which the transistor 62 is not used and in which the nodes 53 and 59 are directly connected to pins of the microprocessor 16 which are indicated by reference numerals 63A and 63B. Both pins 63A and 63B are asserted low to obtain a low resistance between the nodes 53 and 59 and ground and to place both the reference divider and the current measuring divider in the same condition to test for any unbalance of the bridge circuit.

By way of example, the resistors 56, 57 and 58 of the battery current measuring divider may have values of 1M, 10K and 562K and the resistors 50, 51 and 52 of the reference divider circuit may preferably have the same values as resistors 56, 57 and 58. Such resistors need not be precision resistors. Any unbalance of the bridge circuit formed by the reference and battery current measuring dividers is determined as an unbalance count by subtracting a current reading count registered when an output signal is developed from the comparator 31 from a reference reading count registered when an output signal is developed by the comparator 30.

The current reading minus reference reading unbalance count developed with the zeroing means active, i.e. with the transistor 62 conductive, is stored temporarily as an offset count. Then the stored offset count is subtracted from the unbalance count developed with the zeroing means inactive, i.e. with the transistor 62 non-conductive, to develop a reading which may be described as a "raw" battery current reading which can be converted to indicate the proper sign and magnitude and which is free of errors caused by drift of the bridge. Then the converted reading may be normalized using a normalization procedure similar to the aforementioned procedure performed in determining battery voltage. The converted reading is multiplied by the ratio of a normalization reading stored in the EEPROM 17 to the reference reading obtained using the comparator 30 while the transistor 62 is non-conductive.

A temperature reading is obtained using the thermistor 22 which has one terminal connected to ground and an ungrounded terminal connected through a series resistor 64 to the voltage supply line 42, the ungrounded terminal being also connected to the minus input of comparator 32 which has its plus input connected to the ramp voltage line 37. A resistor 65 and a stabilizing capacitor 66 are connected in parallel with the thermistor 22. The parallel resistor 65 has a value which is so related to the value of the series resistor 64 and the characteristics of the thermistor 22 as to produce response which is much more linear than would be the case using only the series resistor 64. By way of example, the thermistor 22 is a NTC resistor having a nominal resistance of 100K at 23 degrees C., the series resistor 64 has a value of 300K and the parallel resistor 65 has a value of 130K. The stabilizing capacitor 66 and each of the aforementioned stabilizing capacitors 49, 54 and 60 may have values of 0.1 microfarads. Also, another stabilizing capacitor 68, having the same value, may be connected between the terminals 18 and 20, as shown.

Another important feature of the monitoring and control unit 10 relates to energy consumption. Since the unit may be permanently attached to a battery, it is important that it draw as little power as possible. Current consumption is minimized with resistors having high values such as those set forth in the foregoing examples. In addition, the processor 16 operates to sense whether the battery is active and to shut off power to monitoring circuitry when no use of such circuitry is required.

In the illustrated embodiment, the voltage supply line 42 is connected to the collector of a PNP transistor 70 the base of which is connected through a resistor 71 to a pin 72 of the microprocessor 16. The emitter of transistor 70 is connected through a capacitor 73 to ground and to the output of a voltage regulator 74 having an input connected to the terminal 20 and the positive terminal of battery 12. The pin 72 is brought low to render the transistor 70 conductive when operation of the monitoring circuits powered from line 42 is required for purposes such as determining current flowing to or from the battery 12 and monitoring battery voltage and temperature. Otherwise, the pin 72 is held in a high state, to prevent conduction of the transistor 70 and conserve energy.

The voltage regulator 74 may be a type S81250 regulator operative to develop a regulated output voltage of 5 volts and all of the integrated circuit components may be designed for 5 volt operation, but it will be understood that a different operating voltage, such as 3 volts, may be used with appropriate selection of components.

It is noted that the output of the voltage regulator 74 is connected to a voltage supply pin 75 of the microprocessor 16 and to a power-up circuit 76 which applies a signal to a master clear input pin 77 when the output of regulator 74 exceeds a certain value, the microprocessor 16 being turned off when the output voltage of regulator 74 is too low.

The output of the voltage regulator 74 is also connected through resistors 79–83 and five LEDs 84–88 of the display board 25 to output pins 89–93 of the microprocessor 16 and through a resistor 94 to an input pin 95 which is connected to ground through the pushbutton switch 26. Normally, all of the pins 89–93 are in a high state and no current is drawn. When the pushbutton switch 26 is closed, one or more of the pins 89–93 may be brought low to energize one of more of the LEDs 84–88 and indicate the approximate state of charge. For example, LED 84 may be energized when the percentage charge is less than 12 percent and LEDs 85–88 may be energized when the percentage charge exceeds 12 percent, 25 percent, 50 percent and 75 percent.

As also shown, a clock circuit 96 is connected to oscillator input terminals of the microprocessor 16 and may supply a 4 MHz clock signal, for example. The data terminal 24 is connected to ground through a resistor 96 which may have a value of 1M, for example.

The EEPROM 17 is connected to the voltage supply line 42 to be energized through the transistor 70 only when necessary. To store and retrieve data from the EEPROM 17, clock and data terminals thereof are connected to pins 99 and 100 of the microprocessor 16, pin 100 being connected to the line 42 through a pull-up resistor 101. As aforementioned, important features of the invention relate to use of the EEPROM 17 in storing calibration data used for normalization of voltage, current and temperature readings. The EEPROM 17 is also programmable at a time of manufacture or a time of modification to include calibration constants and to avoid the need for expensive parts having tight tolerances. For example, separate slope and offset corrections are applied to voltage, current and temperature readings. This not only enables compensation for low tolerance parts but facilitates customization. For example, the same unit can be programmed to function in either Fahrenheit or Celsius by simply changing slope and offset conversion values.

In the unit 10 constructed in accordance with the principles of this invention, data may be stored in the EEPROM 17 in accordance with the following memory allocation table:

| Address | | Data | Initial Value |
|---|---|---|---|
| Dec | Hex | | |
| 0 | 0 | Revision ID | 01 |
| 1 | 1 | Battery Information | 61 |
| 2 | 2 | Nominal Battery Capacity - Low Byte | 49 |
| 3 | 3 | Nominal Battery Capacity - Middle Low Byte | 80 |
| 4 | 4 | Nominal Battery Capacity - Middle High Byte | 38 |
| 5 | 5 | Nominal Battery Capacity - High Byte | 00 |
| 6 | 6 | | 00 |
| 7 | 7 | | 00 |
| 8 | 8 | Maximum Temperature for Fast Charge | 2D |
| 9 | 9 | Minimum Temperature for Fast Charge | 0A |
| 10 | A | Maximum Temperature for Maintenance Charge | 32 |
| 11 | B | Minimum Temperature for Maintenance Charge | 05 |
| 12 | C | | 00 |
| 13 | D | Absolute Maximum Terminal Voltage-High Byte | 2F |
| 14 | E | | 00 |
| 15 | F | | 00 |
| 16 | 10 | Turn On Charge Threshold (0–100%) | 5F |
| 17 | 11 | Charge Cycles between Calibration Requests | 10 |
| 18 | 12 | | 00 |
| 19 | 13 | | 00 |
| 20 | 14 | | 00 |
| 21 | 15 | | 00 |
| 22 | 16 | Delta Temp. with Request to Time * 32 | 0A |
| 23 | 17 | Override Timer Value - Low Byte | 1B |
| 24 | 18 | Override Timer Value - High Byte | 18 |
| 25 | 19 | End of Discharge Voltage - High Byte | 16 |
| 26 | 1A | Negative Delta V Threshold | 05 |

-continued

| Address | | | |
|---|---|---|---|
| Dec | Hex | Data | Initial Value |
| 27 | 1B | Low Battery Level (% Present Capacity) | 05 |
| 28 | 1C | Critical Battery Level (% Pres. Capacity) | 03 |
| 29 | 1D | Immediate Shutdown Level (% Pres. Capacity) | 01 |
| 30 | 1E | Report Mode | 80 |
| 31 | 1F | Report Rate | 00 |
| 32 | 20 | Total Cycle Counter - Low Byte | 00 |
| 33 | 21 | Total Cycle Counter - High Byte | 00 |
| 34 | 22 | Number of Time Out Errors | 00 |
| 35 | 23 | Number of Low Temperature Errors | 00 |
| 36 | 24 | Number of High Temperature Errors | 00 |
| 37 | 25 | Number of High Voltage Errors | 00 |
| 38 | 26 | | 00 |
| 39 | 27 | | 00 |
| 40 | 28 | | 00 |
| 41 | 29 | | 00 |
| 42 | 2A | | 00 |
| 43 | 2B | | 00 |
| 44 | 2C | Present Capacity - Low Byte | 49 |
| 45 | 2D | Present Capacity - Middle Low Byte | 80 |
| 46 | 2E | Present Capacity - Middle High Byte | 38 |
| 47 | 2F | Present Capacity - High Byte | 00 |
| 48 | 30 | Standard Value - Low Byte | B0 |
| 49 | 31 | Standard Value - High Byte | 4B |
| 50 | 32 | Voltage Slope Correction - Low Byte | 00 |
| 51 | 33 | Voltage Slope Correction - High Byte | 01 |
| 52 | 34 | Voltage Offset Correction - Low Byte | 00 |
| 53 | 35 | Voltage Offset Correction - High Byte | 00 |
| 54 | 36 | Current Slope Correction - Low Byte | 00 |
| 55 | 37 | Current Slope Correction - High Byte | 01 |
| 56 | 38 | Current Offset Correction - Low Byte | 00 |
| 57 | 39 | Current Offset Correction - High Byte | 00 |
| 58 | 3A | Temperature Slope Correction Low Byte | 00 |
| 59 | 3B | Temperature Slope Correction High Byte | 01 |
| 60 | 3C | Temperature Offset Correction Low Byte | 00 |
| 61 | 3D | Temperature Offset Correction High Byte | 00 |
| 62 | 3E | Lead-Acid Shut Off Voltage - Low Byte | E0 |
| 63 | 3F | Lead-Acid Shut Off Voltage - High Byte | 2E |
| 64 | 40 | Charge eff. as func. of % capacity 0% | 96 |
| 65 | 41 | Charge eff. as func. of % capacity 1% | D5 |
| 66 | 42 | Charge eff. as func. of % capacity 2% | EE |
| 67 | 43 | Charge eff. as func. of % capacity 3% | F5 |
| 68 | 44 | Charge eff. as func. of % capacity 4 to 89% | F7 |
| 69 | 45 | Charge eff. as func. of % capacity 90% | F7 |
| 70 | 46 | Charge eff. as func. of % capacity 91% | F7 |
| 71 | 47 | Charge eff. as func. of % capacity 92% | F7 |
| 72 | 48 | Charge eff. as func. of % capacity 93% | F7 |
| 73 | 49 | Charge eff. as func. of % capacity 94% | F7 |
| 74 | 4A | Charge eff. as func. of % capacity 95% | F7 |
| 75 | 4B | Charge eff. as func. of % capacity 96% | F7 |
| 76 | 4C | Charge eff. as func. of % capacity 97% | EC |
| 77 | 4D | Charge eff. as func. of % capacity 98% | C5 |
| 78 | 4E | Charge eff. as func. of % capacity 99% | 7D |
| 79 | 4F | Charge eff. as func. of % capacity >99% | 41 |
| 80 | 50 | Charge eff. as func. of temp. 0 degrees | F9 |
| 81 | 51 | Charge eff. as func. of temp. 4 degrees | F9 |
| 82 | 52 | Charge eff. as func. of temp. 8 degrees | F9 |
| 83 | 53 | Charge eff. as func. of temp. 12 degrees | F9 |
| 84 | 54 | Charge eff. as func. of temp. 16 degrees | F9 |
| 85 | 55 | Charge eff. as func. of temp. 20 degrees | F9 |
| 86 | 56 | Charge eff. as func. of temp. 24 degrees | F9 |
| 87 | 57 | Charge eff. as func. of temp. 28 degrees | F0 |
| 88 | 58 | Charge eff. as func. of temp. 32 degrees | E6 |
| 89 | 59 | Charge eff. as func. of temp. 36 degrees | DC |
| 90 | 5A | Charge eff. as func. of temp. 40 degrees | D2 |
| 91 | 5B | Charge eff. as func. of temp. 44 degrees | C7 |
| 92 | 5C | Charge eff. as func. of temp. 48 degrees | BE |
| 93 | 5D | Charge eff. as func. of temp. 52 degrees | B4 |
| 94 | 5E | Charge eff. as func. of temp. 56 degrees | AA |
| 95 | 5F | Charge eff. as func. of temp. 60 degrees | 9F |
| 96 | 60 | Self-dischge corr. factor 0 degrees low byte | 06 |
| 97 | 61 | high byte | 00 |
| 98 | 62 | Self-discharge corr. factor for 4 degrees | 0B |
| 99 | 63 | | 00 |
| 100 | 64 | Self-discharge corr. factor for 8 degrees | 13 |
| 101 | 65 | | 00 |
| 102 | 66 | Self-discharge corr. factor for 12 degrees | 22 |

-continued

| Address | | | |
|---|---|---|---|
| Dec | Hex | Data | Initial Value |
| 103 | 67 | | 00 |
| 104 | 68 | Self-discharge corr. factor for 16 degrees | 3D |
| 105 | 69 | | 00 |
| 106 | 6A | Self-discharge corr. factor for 20 degrees | 6D |
| 107 | 6B | | 00 |
| 108 | 6C | Self-discharge corr. factor for 24 degrees | C2 |
| 109 | 6D | | 00 |
| 110 | 6E | Self-discharge corr. factor for 28 degrees | 58 |
| 111 | 6F | | 01 |
| 112 | 70 | Self-discharge corr. factor for 32 degrees | 61 |
| 113 | 71 | | 02 |
| 114 | 72 | Self-discharge corr. factor for 36 degrees | 36 |
| 115 | 73 | | 04 |
| 116 | 74 | Self-discharge corr. factor for 40 degrees | 75 |
| 117 | 75 | | 07 |
| 118 | 76 | Self-discharge corr. factor for 44 degrees | 36 |
| 119 | 77 | | 0D |
| 120 | 78 | Self-discharge corr. factor for 48 degrees | 65 |
| 121 | 79 | | 17 |
| 122 | 7A | Self-discharge corr. factor for 52 degrees | 6D |
| 123 | 7B | | 29 |
| 124 | 7C | Self-discharge corr. factor for 56 degrees | 5C |
| 125 | 7D | | 49 |
| 126 | 7E | Self-discharge corr. factor for 60 degrees | A7 |
| 127 | 7F | | 7C |

FIGS. 3–10 are flow diagrams illustrating the operation of the unit 10 in which, as aforementioned, the microprocessor 16 may be a type 16C57XT processor, for example. The type 16C57XT processor is a 8-bit, fully static EPROM based CMOS microcontroller employing a RISC-like architecture and is manufactured by Microchip Technology Inc. It is operative with instructions which are all single cycle instructions except for program branches and it has a power saving sleep mode and watchdog timer. It will be understood that other types of microprocessors may be used.

The flow diagram of FIG. 3 illustrates the overall operation. At an initial power up of the unit 10, or when waking from a sleep condition, ports of the processor are set up as appropriate. Power-up operations are performed if they have not been previously performed. Such operations may include, among other things, bringing the pin 72 low to render transistor 70 conductive and supply an operating voltage to line 42, so as to permit retrieval of set-up data from the EEPROM and storage in registers. Power-up operations also include initialization of a loop counter which determines the number of time-outs of the watchdog timer and thereby determine the duration of a sleep time between readings.

After performing power-up operations, or immediately after awakening from a sleep condition, the program is at a main loop point. Display operations are performed which may include checks to see if the battery is presently being charged or if the display pushbutton switch 26 has been closed. In either case, one or more of the pins 89–94 may be brought low to energize one or more of the LEDs 84–88 of the display 25.

At this time, the loop counter is decremented and a "HSTOFF" flag is cleared, indicating if not subsequently set that the host is on and that, among other things, flow of charging or discharging current should be monitored to determine the state of charge. Then a test is made to see whether the unit 10 should be awake. If not, the "HSTOFF" flag is set and a power-down operation is performed in which the pin 72 is brought high to render the transistor 70 non-conductive. Then the loop counter is tested. If the count is not zero, the microprocessor 16 is placed in the low power consumption sleep condition. At this time, with the transistor 70 non-conductive, no power is applied to the various circuits connected to the line 42, so as to conserve energy.

If the count of the loop counter is zero, or if the unit 10 should be awake as will be the case if a charging operation is being performed, a series of operations are performed including an initial power-up operation in which the transistor 70 is rendered conductive to develop a supply voltage on line 42. Then the unit 10 takes and translates voltage, current and temperature readings which are illustrated in the flow diagrams of FIGS. 4 and 5. Then, as appropriate, current, charge and percent of full charge values are adjusted and fast charge request and error flags are set or cleared.

Then a test of the HSTOFF flag is made. If it is set, a power-down operation is performed to render the transistor 70 non-conductive and the unit 10 is placed in the low power consumption sleep condition. If the host is on, as indicated by a clear condition of the HSTOFF flag, charge control, calibration and protective operations are performed. Such charge control operations include a determination of the type of battery being charged, followed by appropriate tests to determine whether a fast charge operation should be terminated. The calibration operations are performed if the voltage has been decreased below a discharge limit and if conditions are otherwise appropriate for doing so. The protective operations include determinations of whether the unit 10 is at an immediate shut-down limit, a critical battery limit or at a low battery limit.

Next, any enabled data reporting is performed and any commands issued by the host are executed. The program then loops back to the main loop point.

FIG. 4 is a flow diagram showing details of an operation shown generally in a block of FIG. 3, in which readings are taken and translated. The initial step in the operation shown in FIG. 4 is to apply a short to the current-measuring bridge, accomplished with the circuit of FIG. 1 by bringing the pin 63 high to render the transistor 62 conductive and to connect nodes 53 and 59 together, or with the modification of FIG. 2 by bringing pins 63A and 63B low to place both nodes 53 and 59 at substantially ground potential. Then readings are taken, using a procedure as illustrated in detail in FIG. 5. Next, a bridge offset is calculated by subtracting a reference reading developed in response to an output from comparator 30 with a current reading developed in response to an output from comparator 31.

The next step is to unshort the bridge by bringing pin 63 low with the circuit of FIG. 1 or by tri-stating the pins 63A and 63B with the circuit of FIG. 2. Then another set of readings are taken, again using the procedure shown in FIG. 5, after which a "raw" current reading is generated by subtracting the reference reading developed with the bridge unshorted and the previously developed offset reading from the current reading developed with the bridge unshorted. The raw current reading is then converted to sign and magnitude.

Then each of the voltage, current and temperature readings is normalized, each being multiplied by the ratio of a normalization value stored in the EEPROM 17 to the reference reading obtained with the current measuring bridge in the unshorted condition. Finally, the readings are converted to millivolts, milliamps and degrees by multiplying each reading with a slope value and adding an offset values, the slope and offset values being stored in the EEPROM 17.

Further important features relate to analog to digital conversion using procedures shown in the flow diagram of FIG. 5 together with the configuration of the circuitry using the microprocessor 16, ramp voltage generator 28 and comparators 29–32 as illustrated in FIGS. 1 and 2.

These features result from a recognition of problems relating to gauging of the amount of energy in a battery pack and the development of solutions thereto. Gauging of energy is accomplished by numerically integrating the current flowing into or out of it. Since the current measurements are made periodically but the actual flow may be varying, it is desirable to keep the interval between readings as short as possible. It was determined that the optimal scheme was to take all four readings (voltage, current, temperature and reference) simultaneously, i.e. from a single generation of the ramp voltage.

Having determined that the readings should be taken simultaneously, a straight-forward approach might be to initiate the ramp and then enter a loop wherein sequentially tests are made for transitions on the four comparator outputs. With this approach, if no transitions occur, a counter would be incremented and then the sequential tests would be repeated. If a transition is detected, the present count would be saved as the value associated with that pin and then the pin would be deactivated so that it will not register again. When the counter overflows, the routine would be completed.

When studied, it is found that such an approach has two deficiencies. First, it produces a fairly long loop time. Each pin requires at least two instructions (one to test the pin and one to jump to the storage portion of the routine). This is in addition to the overhead of incrementing a two byte counter and testing for its overflow. The second deficiency is the error that occurs when two comparators transition at the same time. If the code is structured in a non-reentrant manner (ie. only one transition can be serviced per loop) simultaneous transitions will produce counts that differ from each other by one. If the loop is made reentrant, it ends up with all loop times not being equal. This will also distort readings.

To circumvent these problems, a scheme is used in which each of the comparators 29–32 is so configured such that its output is low before the ramp is initiated and all of the comparators are brought into the processor on pins of the same port, pins 33–36 being on the same port in the illustrated embodiment. The routine begins as shown in FIG. 5 by setting up a mask byte with a 1 in each bit that corresponds to a comparator pin (i.e., if bit 3 of the port is from a comparator, bit 3 of the mask is initially set to 1). The count is set to zero and then the ramp is turned on by tri-stating the pin 45 to allow charging of the ramp capacitor 38 through the transistor 39. In a main loop, the count is incremented and tested for overflow, the ramp being turned off by bringing the pin 45 low when the count overflows.

Until an overflow occurs, the mask is logically ANDed with the port. If the result is zero, showing that no transitions have occurred, the loop is repeated with the counter being again incremented and tested. If the result is not zero, one or more transitions have occurred. The mask is analyzed at this point to see which comparator or comparators has or have flipped. In one approach, the count might be then stored accordingly, but an alternative approach is used in the illustrated procedure, in which the mask and present count are simply stored in temporary locations. As shown in the flow diagram of FIG. 5, the details of sorting out which comparator or comparators correspond with the mask data are left until after the end of the routine, after the count overflows and the ramp is turned off. This latter approach requires more temporary storage, but produces less distortion in the loop time when a transition occurs. With either approach, when a transition does occur, the mask is modified so that the same comparator cannot again produce a reading.

Figure 6:
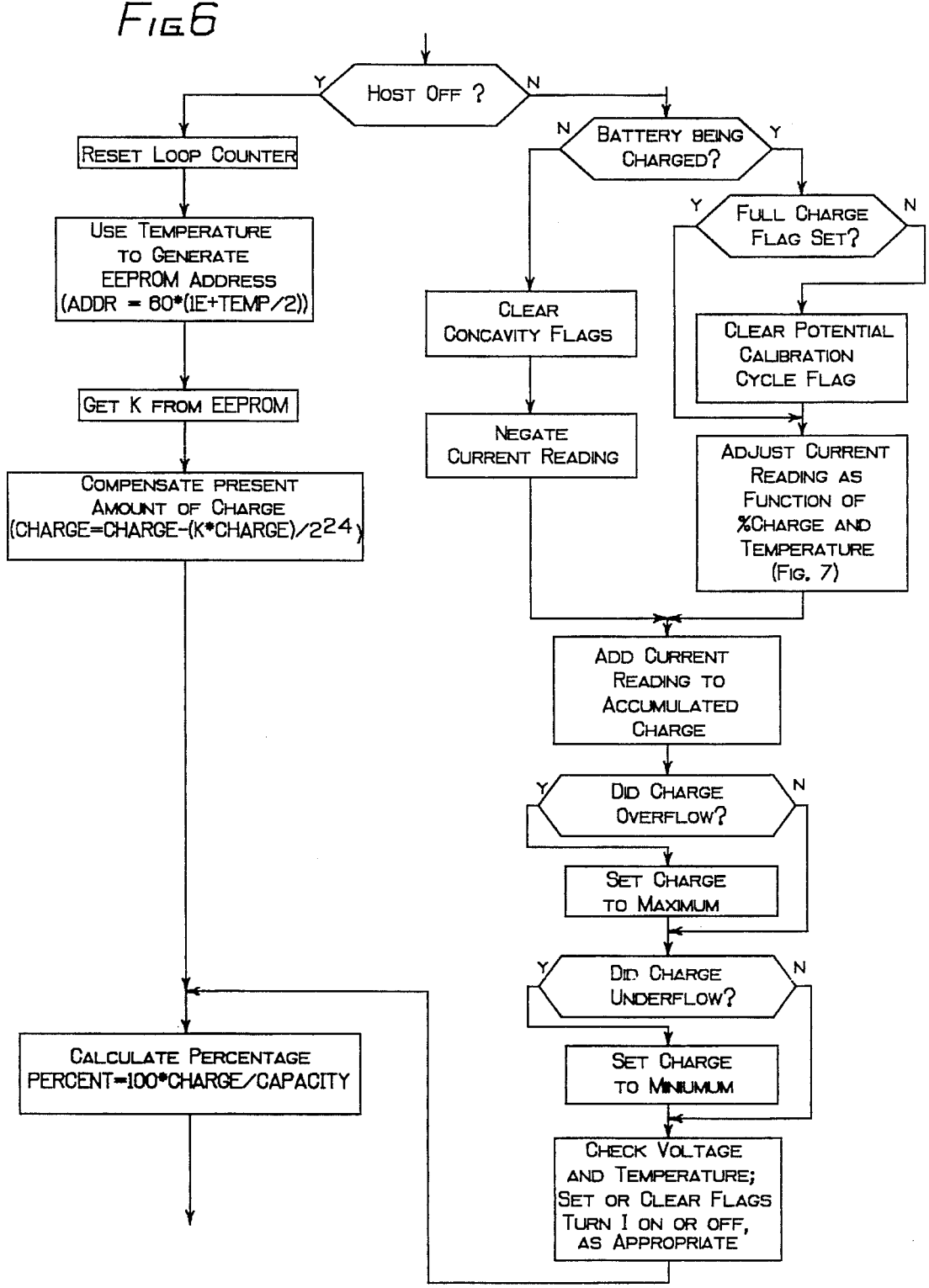
FIG. 6 is a flow diagram illustrating operations which relate to the adjustment of current, charge and percent of full charge values.

FIG. 6 illustrates operations relating to the integration of charge and discharge current flowing into and from the battery 11, for the purpose of determining the state of charge of a battery, measured in terms of percentage of the charge capacity. When the host is off and the battery is neither being charged nor discharged, the system compensates for self-discharge of the battery which is a function of temperature. As shown, the temperature reading is used to generate a EEPROM address and to obtain a "K" factor for adjustment of a "CHARGE" value as to the present amount of charge in the battery.

When the host is on and the battery is being charged, a potential calibration flag is cleared unless a full charge flag is set. Then the current reading is adjusted as a function of percentage of charge and temperature, using an operation as shown in detail in FIG. 7. When the battery is being discharged by a load current, the current reading is simply negated. Then the adjusted charge current reading or the negated discharge current reading is added to the accumulated charge value. If the result exceeds the capacity of the battery, it is set to its maximum value. If it underflows, it is set to its minimum value. Finally, whether modified as a function of self-discharge current, or from charge or load current, the percentage of charge is calculated according to the ratio of the charge value to a capacity value.

Figure 8:
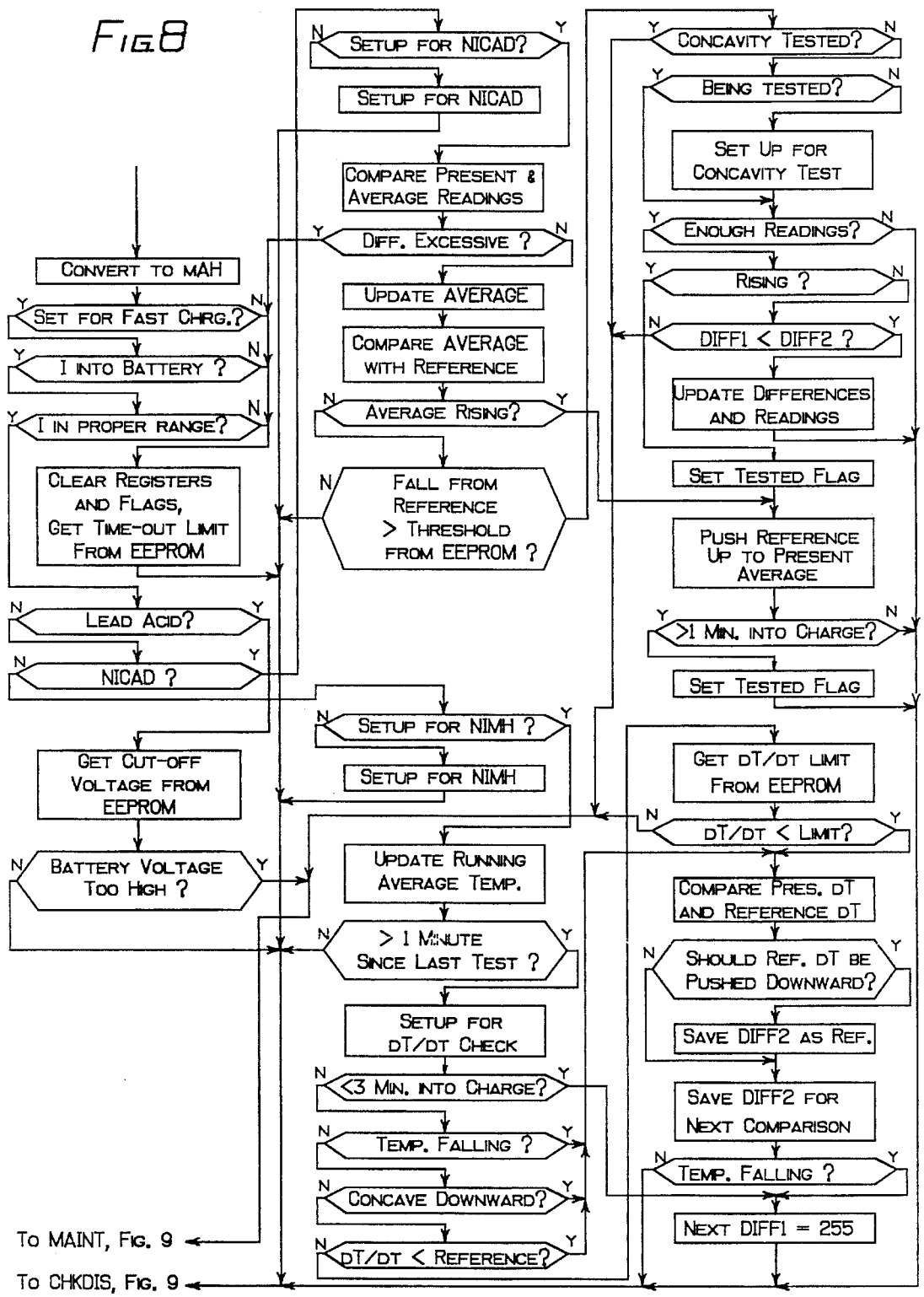
FIG. 8 is a flow diagram illustrating types of monitoring operations, one being based upon a determination of whether battery voltage exceeds a certain limit, another being based upon a negative delta determination and a third being based upon a determination of whether the rate of increase of battery temperature exceeds a certain threshold value.
Figure 9:
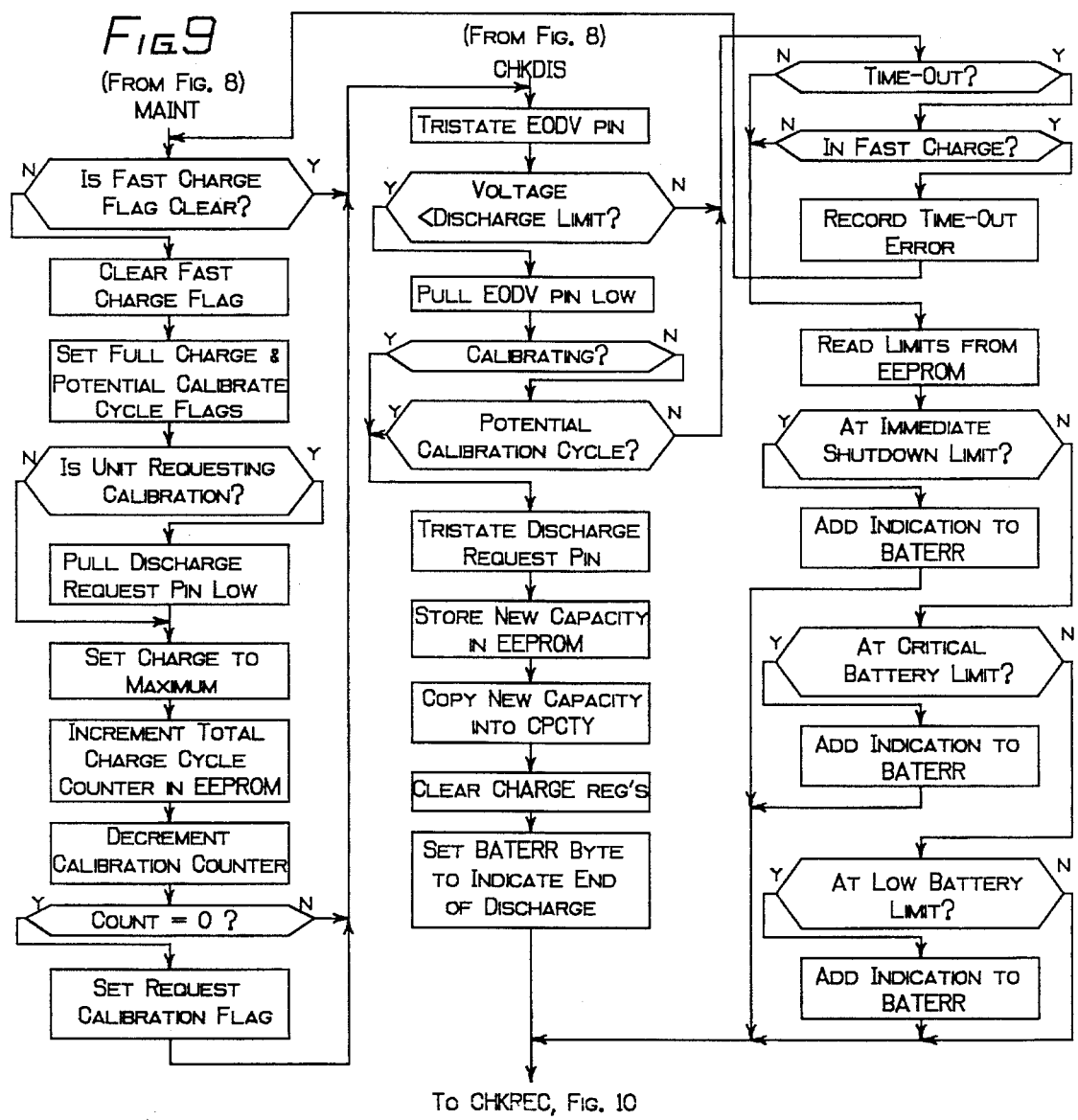
FIG. 9 is a flow diagram illustrating certain maintenance operations and certain checking of discharge current operations.

FIGS. 8 and 9 show charge control, calibration and protective operations performed after calculating the charge as a percentage of capacity. If the host is off, a power-down operation is performed and the unit 10 is placed in a sleep condition. If the host is on, determinations are made as to whether charge control operations are to be performed and, if so, the type of battery being charged. Three types of monitoring operations are shown in FIG. 8. The first is for a lead acid battery and is based upon determining whether the voltage exceeds a certain limit. The second is for a NICAD battery and is based in part upon a determination of whether the voltage has dropped by more than a certain threshold value after reaching a peak value. The third is for a NIMH type of battery and is based in part upon a determination of whether the rate of increase of battery temperature exceeds a certain threshold value.

FIG. 9 shows "maintenance" operations performed when a fast charge is terminated as a result of monitoring operations of FIG. 8, including operations relating to calibration of the battery. FIG. 9 also shows "check discharge" operations which are performed when no maintenance operations are required and which include calibration operations and also protective operations.

Figure 10:
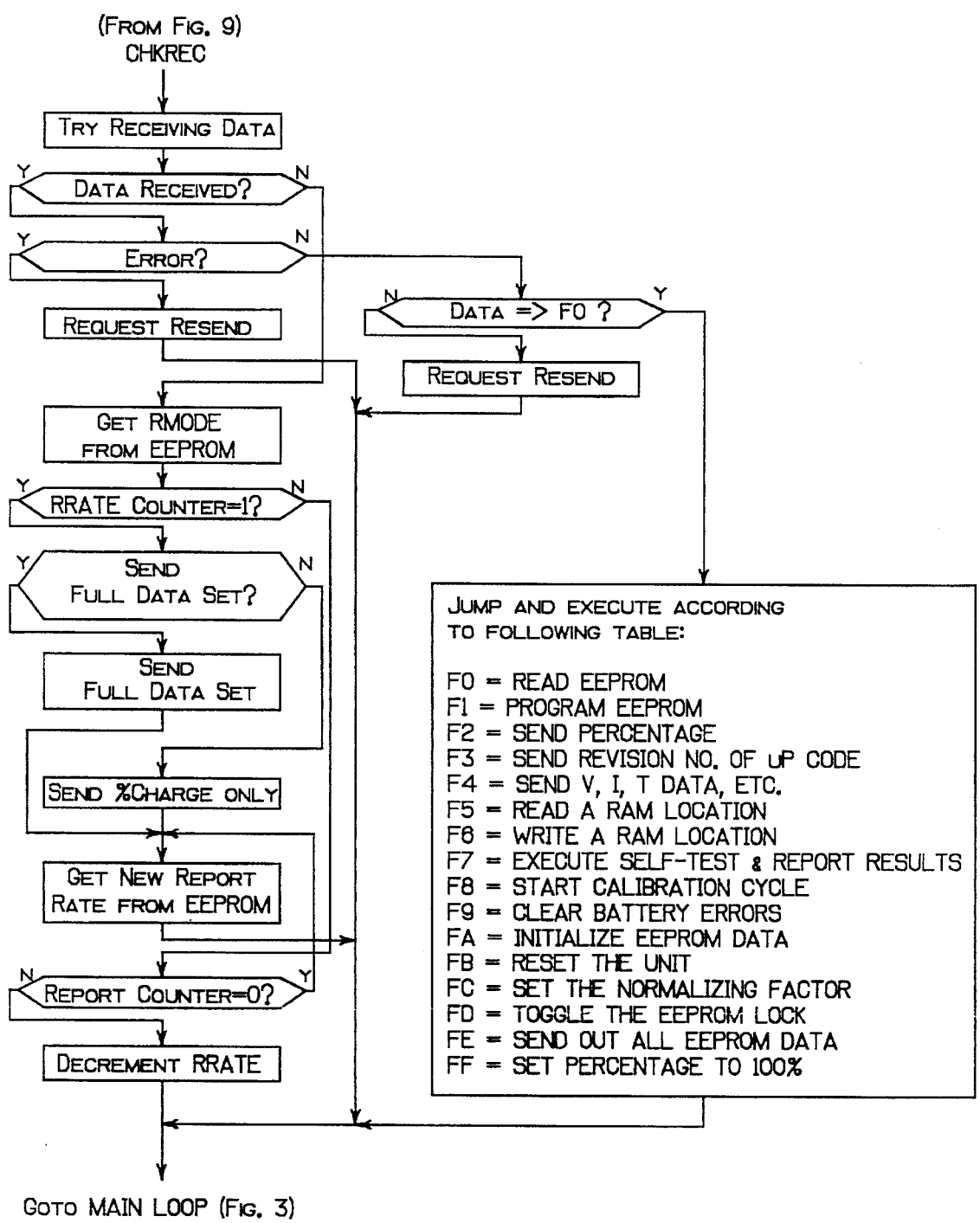
FIG. 10 is a flow diagram illustrating data receiving and sending operations performed following the operations of FIG. 9.

FIG. 10 shows data receiving and sending operations performed following the operations of FIG. 9.

The operations illustrated in the flow charts will be clarified by a discussion of concepts which were considered in the development thereof and of how such concepts are implemented in the illustrated embodiment.

With the illustrated embodiment operative with a type 16C57XT processor and 4 MHz clock, each instruction cycle takes 1 microsecond, the reading loop cycle time is 10 instruction cycles and a 16 bit counter is used. This means that a group of four readings takes about 0.655 seconds to complete. To measure current, recall that a set of readings must first be made with the bridge shorted and then another set made with the bridge open. This doubles the full reading time to 1.31 seconds.

Of the total time needed to execute a single pass through the firmware of the unit 10, the fixed measurement time makes up the vast bulk. As a result, each pass through the firmware appears to take the same amount of time regardless of the events that may actually occur. This stable time-base is used as the basis of a numerical integration of currents to produce total energy.

The concept of numerical integration is quite simple. Each current reading, with its sign and magnitude, is added into an overall total. As current flows into the pack, this total grows. As current flows out of the pack, the total diminishes. The total thus represents the amount of energy stored in the pack. If the time-base were not constant, two identical current readings would not necessarily represent the same amount of energy. Each reading would have to be scaled by the loop time before it was added into the overall total. The scheme used in the illustrated embodiment avoids this problem.

It is found that restrictions must be placed on the accumulated total. It cannot be allowed to go below zero. Further, since each pack has a finite capacity, the total cannot be allowed to grow without bound. For these reasons, the unit 10 uses measurements of voltage and/or temperature to independently verify when the pack is fully depleted or fully charged. These and other variables may then be used to scale the current before it is added into the total.

As a pack nears full charge, much of the energy being forced into it actually gets dissipated as heat. This energy is lost and cannot be retrieved during discharge. A similar effect occurs when charge is introduced to an empty pack. The result is that charging efficiency is a function of the present state of charge. Charge (and discharge) efficiencies are also a function of temperature.

Figure 7:
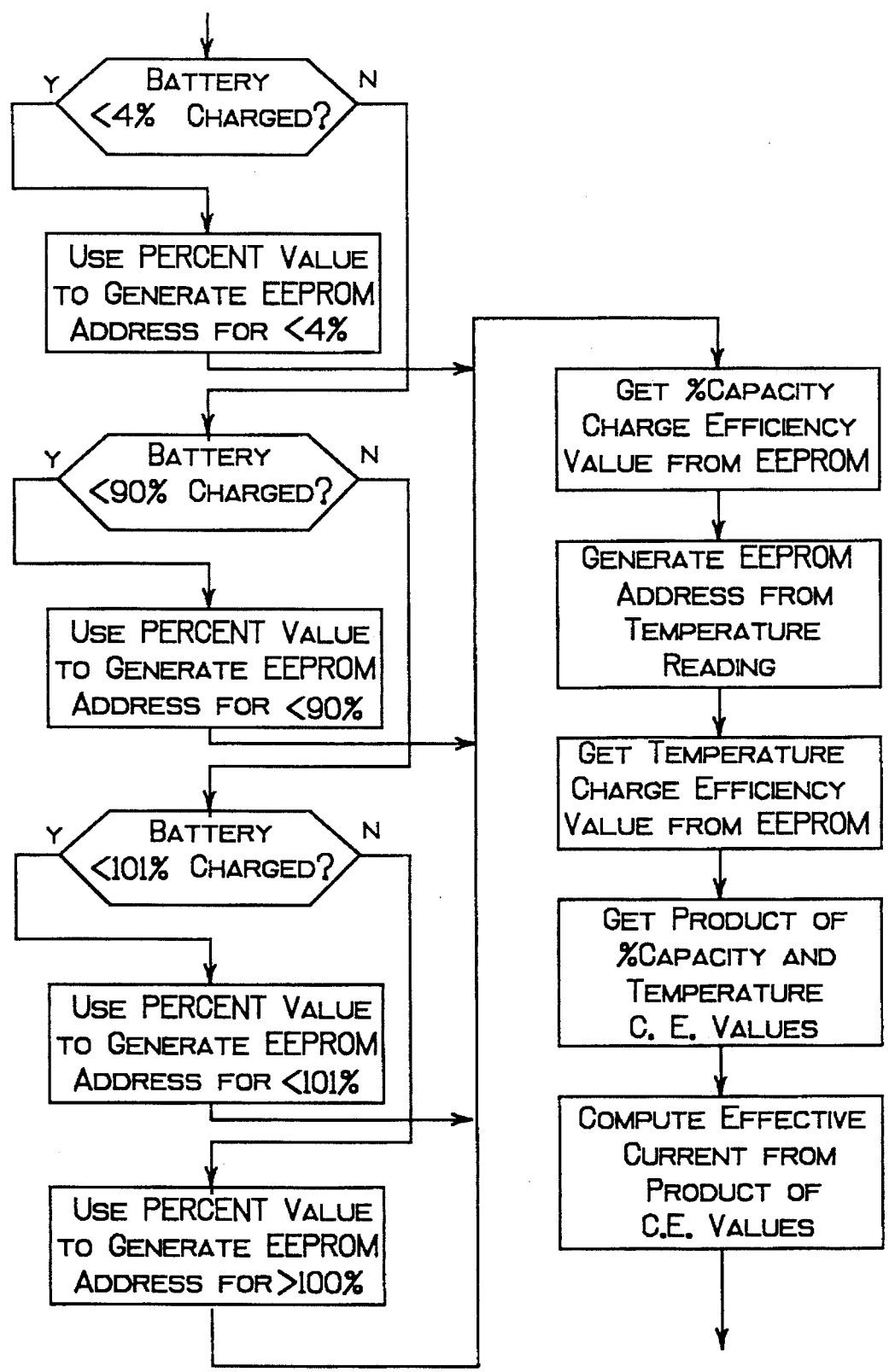
FIG. 7 is a flow diagram illustrating operations which relate specifically to adjustment of current readings as a function of percentage of charge and temperature.

The unit 10 accounts for these efficiencies with a series of lookup tables. When a current reading is made, the temperature, estimated state of charge and sign of the current are used to retrieve efficiency factors which are then multiplied by the current magnitude before it is added into the overall total. More particularly, as is shown in FIG. 7, the effective value of current is computed as a function of both the state of charge and the temperature, using values stored in tables in the EEPROM 17. The tables are user-programmable which enables the unit 10 to be tailored to a specific battery chemistry and configuration.

All batteries exhibit a phenomenon known as self-discharge. That is, batteries slowly lose energy even if they sit idle, typically a few percent per day. For a fixed temperature, this results in an exponential decay of charge. More importantly, though, the rate of discharge also increases exponentially with temperature.

The unit 10 accounts for this "double exponential" self-discharge. The pack temperature is used to retrieve a value from a look-up table. The value is then used to generate a percentage by which the remaining charge is periodically diminished. This correction is done once every 100 seconds or so, a loop counter being used in the illustrated embodiment, as is shown in the flow diagram of FIG. 6. If the correction is done much more often than this, the correction is so tiny that it must be carried to many decimal places to maintain accuracy. If it is done too infrequently, the accuracy gets diminished at high temperatures.

An alternate, but equally valid approach, would be to have a constant correction factor and then use temperature to select how often the correction is made.

In order for the unit 10 to generate a measure of "percent full", it is necessary to know the total capacity of a pack. The ratio of energy in the pack to the total capacity then produces the percent of charge remaining. Pack capacity varies with age, temperature and other factors. Typically, a new pack may be rated at 20% below its actual capacity so that it will stay within specification over its life cycle.

When the unit 10 is initially calibrated, an estimated value of pack capacity is programmed into it. This value may then be periodically measured and updated by the unit 10, details of the calibration operation being shown in FIG. 9.

The unit 10 measures capacity in essentially the same manner as the cell manufacturers do. As the pack is discharged from fully charged state to below a predetermined voltage limit, the amount of energy extracted from the pack is tallied. This is done by numerically integrating the discharge current without applying any sort of efficiency compensations. As is shown in FIG. 6, discharge current occurring when the unit is on is simply negated to produce a negative value which is added to the accumulated charge.

In the unit 10, a flag bit gets set when the selected charge termination scheme detects that the pack is full. This flag indicates that a potential calibration cycle is in progress. As the pack is subsequently discharged, the discharge tally registers measure the amount of energy extracted. If, at any time, the unit 10 senses that current is flowing into the pack, the flag is cleared, thereby canceling the potential calibration. The clearing of a potential calibration cycle flag is shown in the right-hand portion of FIG. 6. As is shown in the upper central portion of FIG. 9, if the pack voltage drops below a discharge or "end of discharge voltage" (EODV) limit specified for it with the flag bit set, the total discharge tally is saved as the new pack capacity. The unit 10 keeps track of the number of charge cycles it has experienced since the last capacity calibration and uses this information to periodically request that it be done.

In addition to the automatic calibration just described, the unit 10 can be forced into calibration mode by command from the host. This allows the user to define his own conditions for calibration.

The unit 10 has several mechanisms by which it can detect when a pack has reached full charge. The primary schemes are negative delta V, dT/dt, and absolute voltage. The user may choose which of these to use as the primary termination technique and that scheme will be the one that triggers potential calibration situations.

Negative delta V is typically used with nickel-cadmium batteries. The scheme employed in the unit 10 is quite similar to that covered in the aforementioned patents and patent applications and includes exponential averaging, false peak detection and other features thereof.

Exponential averaging is used to smooth the raw voltage data. The highest observed value of average voltage is stored for reference and, when the voltage begins to fall from this reference, there is the potential for charge termination. For termination to occur, the drop must be greater than some user-specified threshold. (The threshold may alternately be taken as some fixed fraction of the peak value.)

Batteries may exhibit a false peak in voltage when they commence fast charge. To avoid erroneous termination, peaks that occur near the start of a charge cycle are further screened for proper concavity. If the voltage profile after the peak has an upward concavity to it, it is assumed to be a false peak and charge continues. If it has a downward concavity, fast charge is terminated.

Concavity is determined by calculating the second derivative of the voltage from three equally spaced readings. The difference between the first and second points is compared with the difference between the second and third points. If the second difference is greater than the first difference, the curve is concave downward. If the second difference is less than the first difference, the curve is concave upward. If they are equal, the concavity is indeterminate, and the unit 10 as illustrated operates to terminate charge.

If upward concavity is detected, the test is repeated. This is accomplished by saving the latter difference for reference and logging a new reading. This new reading is then used to generate a more recent difference. Again the differences are compared and a decision made. The concavity tests continue until either the voltage starts to rise or downward concavity is detected.

In practical applications of the unit 10, load currents may change during battery charging. This results in variations in pack voltage which can trip the negative delta V detector. Fortunately, the unit 10 is continuously monitoring pack current. If a drop from peak correlates with a change in load current, the negative delta V detector simply resets its reference value. Although repeated load changes could theoretically prevent termination from ever occurring, the unit 10 also monitors pack temperature and uses this to provide backup termination.

Another important feature is the use of a dT/dt termination technique which has been found to be particularly advantageous when used with NIMH (nickel-metal hydride) cells and involves monitoring the change of pack temperature with time. When temperature rises faster than some user specified limit, fast charge is terminated.

When charge current is applied to a NiMH battery, the pack temperature generally rises. This rise is due to two main sources: joule heating from the drop across the internal resistance of the cells and heat released by the exothermic chemical reaction that occurs during charge. It is found that the profile of temperature as a function of time is related to other factors as well, such as various charge efficiencies, ambient conditions, and geometries of the cells and packaging. Important features of the unit 10 relate to operations which take such factors into consideration and achieve highly accurate and reliable operation.

For the simplest case, a formed pack charged at constant ambient temperature and at "1 C" rate, i.e. with a charging current in milliamperes equal milliampere-hour rating of the battery, the cell temperature will initially climb quite rapidly, typically around 0.5 degrees C. per minute. The rate of temperature rise slows toward the middle of the charging profile, rising again as the pack approaches full charge. The result is that the initial dT/dt rate may be equal to or larger than the dT/dt rate at the desired termination point.

After discovery of this and other problems with a simple dT/dt level sensing technique, a number of improvements were developed and are included in the illustrated unit 10 for determining end of charge.

If the derivative of temperature is plotted as a function of time, the resulting graph typically looks like a cross-section of a bowl. The unit 10 monitors this curve and inhibits termination as long as the derivative is falling (i.e. as long as the temperature rise is slowing).

Experience shows that the derivative may not decline monotonically, but may randomly evidence brief periods of slight increase. To protect against false terminations, an additional safeguard is incorporated into the firmware. The unit may start after elapse of a certain delay time following the start of a charge cycle to establish a minimum reference value of dT which gets pushed downward whenever the dT/dt curve hits a new low point. For example, in a unit designed for charging a typical NIMH battery at a 1 C rate, the start may commence with the thrid minute of a charge cycle. Termination is inhibited unless the dT value rises by more than 0.08 degrees C./minute from this low point. Thus, the reference value follows its way down the dT/dt profile until the absolute minimum is reached. Typically, with a 1 C charge rate, this minimum is between 0 and 0.09 degrees C./minute.

As full charge approaches and the rate of temperature increase starts to rise, the derivative quickly passes the 0.08 degrees C./minute threshold and arms the unit 10 to terminate charge when the user-specified dT/dt rate is reached. Simply stated, termination can occur only when three criteria are met: 1) the derivative of temperature must be more than 0.08 degrees C./minute above its minimum value, 2) the derivative must be rising, 3) the derivative must be equal to or exceed the user-set limit.

This scheme allows very small dT/dt thresholds to be used—as small as 0.1 degrees C./minute—without susceptibility to false terminations. This is important when charging unformed and deeply discharged packs. Typically, an unformed pack will evidence an initial rise of 0.75 degrees C./minute. At full charge the rise may not exceed 0.3 degrees C./minute. Once the pack is formed, however, these values typically reverse themselves. There is a small initial rise and a large rise at full charge. Obviously it is important to use a shutoff limit small enough to catch both cases.

The termination scheme of the unit 10 provides the most reliable results over the broadest range of charging conditions. A study of the effects of various initial battery conditions, charge rates, and case characteristics has not produced evidence of any instance where the scheme fails.

Information from the unit 10 may be accessed in a number of ways. The simplest method is to have some sort of display built into the pack. Generally, a display of this sort is only used to show the percent of charge remaining, and often to a very crude resolution. Typical displays would include a series of LEDs (with a button to activate it) or some form of LCD.

The unit 10 has five onboard display pins 89–93 that can operate in one of two selectable modes. In one mode, each of the pins 90–93 represents an 25% increment in percent of full charge and the pin 89 indicates a charge of less that 10%. In the other mode, the four pins 90–93 operate in a BCD manner and can display information in increments of 10%.

Whether or not the display pins are used, the host equipment can also access battery information via a serial data link. The link may conform to any of a variety of standards (RS-232, , I²C Dallas Semiconductor, etc.) or be of a custom design.

To accommodate as wide a variety of applications as possible, several modes are provided by which information may be accessed. In polled mode, the host equipment sends commands to the unit 10 and gleans information from the responses. Typically, commands are provided that return just the percent of charge remaining or a burst of all the battery data. Additional commands allow access to the internal RAM or EEPROM locations, as well as a complete dump of EEPROM contents or performance of diagnostic functions.

In burst mode, information is sent automatically to the host at fixed intervals. This frees the host from having to support a bi-directional data link and from sending commands. User-configurable registers determine the content and frequency of the data burst. With the illustrated unit 10, the user may select between just the percent of charge remaining or a complete set of battery parameters. Additionally, the user may select how often the information is sent. The range is from every 1.75 seconds to every 224 seconds in steps of 1.75 seconds.

End of charge information may be accessed from either the serial data stream or from a specially dedicated hardware line connected to the terminal 23. This signal may be used to control an external charge current source. When the unit 10 senses that the pack is full or out of temperature range, it turns off the charge current. When the pack is sufficiently empty and the temperature is in range, it turns on the charge current.

Although this same information is available in the data stream, the addition of the terminal 23 to which a dedicated hardware line may be connected allows the pack to be charged in a "dumb" charger separate from the host.

Another feature relates to history tracking. The unit 10 module generally contains some form of non-volatile memory (typically an EEPROM) to save user configuration values. In the illustrated unit, space is set aside to track the history of the pack. Along with the present pack capacity, there is a total charge cycle counter and a number of registers to tally error conditions.

These error conditions include situations where the battery parameters are outside limits set by the user: the temperature is too high, the temperature is too low, the voltage is too high, the current is too high, or a charge cycle took too long. Other situations could also be included.

When each type of error occurs, a separate flag bit gets set in the error byte of the unit 10. This byte is sent as part of the serial data stream or may be read by polling. In any case, the flag bits are only cleared when the unit 10 is instructed to do so. At this point, the appropriate error counters are also incremented. This history information is useful in judging the age and health of the pack and may be used by manufacturers to decide whether to honor a warranty.

Another feature relates to EEPROM lock. Since the information contained in the EEPROM is so pervasively critical in proper operation of the unit 10 (calibration values, configuration values, pack history, etc.), it is important to protect it from accidental or intentional tampering. To this end, a software lock is incorporated that limits users from altering the information.

When the unit 10 experiences a power-up condition, it clears a RAM location that serves as the lock. The unit 10 will not permit writes to most EEPROM locations if this byte has any value other than AA(hex). To perform a write, the host must first issue a command to open the lock. The lock byte is changed to AA and the write may proceed.

Presently, the lock stays open until it is again shut by command from the host. For higher security, a number of alternate schemes could be implemented. For instance, the lock could automatically shut after each write. Alternately, the lock could automatically shut after a fixed time-out period. It is anticipated that, in critical situations, the host equipment will simply not allow the open lock command to be issued.

It will be understood that modifications and variations may be effected without departing from the spirit and scope of the novel concepts of this invention.

I claim:

1. A monitoring unit for monitoring the condition of charge of a battery, comprising: processor means operable during flow of charge current to said battery and discharge current from said battery for performing periodic read and processing operations, each read operation including producing a battery current reading corresponding to net current flowing to said battery, and each processing operation including producing an output reading from said battery current, and adding said output reading to a stored accumulated charge value indicating the condition of charge of said battery, said producing of said output reading from said battery current reading including adjusting said battery current reading as function of operating conditions to produce said output current reading as a function of net change in energy stored in said battery since a last preceding read operation.

2. A monitoring unit as defined in claim 1, said adjusting of said battery current reading as a function of operating conditions including adjusting said battery current reading as a function of said stored accumulated charge value when said battery current reading has a positive value during charging of said battery.

3. A monitoring unit as defined in claim 2, including means for supplying a charge capacity value for said battery, said adjusting of said battery current reading as a function of said stored accumulated charge value being performed by determining the product of said battery current reading and a charge capacity factor which is a function of the ratio of said stored accumulated charge value to said charge capacity value.

4. A monitoring unit as defined in claim 3, means storing a table of said charge capacity factors in memory for access according to said ratio of said stored accumulated charge value to said charge capacity value.

5. A monitoring unit as defined in claim 3, said processing means being operable in a calibrating mode after charging of said battery to a full charge condition and during a subsequent discharge of said battery to a certain discharge condition to determine a resultant decrease in said accumulated charge value and to then adjust said charge capacity value as a function of said decrease in said accumulated charge value.

6. A monitoring unit as defined in claim 1, each of said read operations including producing a temperature reading, and said adjusting of said battery current reading as a function of operating conditions including operating when said battery current reading has a positive value during charging of said battery to adjust said battery current reading as a function of said temperature reading.

7. A monitoring unit as defined in claim 6, means storing a table of temperature factors in memory for access according to said temperature reading, said adjusting of said battery current reading as a function of said temperature reading being performed by determining the product of said battery current reading and said temperature factor.

8. A monitoring unit as defined in claim 1, said processor means being operable during inactive conditions of no flow of charge current to or discharge current from said battery for periodically performing a self-discharge correction, each self-discharge operation serving to effect a reduction in said stored accumulated charge which is a function of elapsed time while in said inactive condition and since a last preceding self-discharge operation.

9. A monitoring unit as defined in claim 8, said processor means being operable during said inactive conditions to to perform a read operation including producing a battery temperature reading, said self-discharge correction serving to effect said reduction in said stored accumulated charge as a function of said temperature reading.

10. A monitoring unit as defined in claim 9, wherein the time between said periodically performed self-discharge correction is substantially constant, said reduction in said stored accumulated charge being reduced in accordance with a temperature factor which is a function of said battery temperature reading.

11. A monitoring unit as defined in claim 10, means storing a table of temperature factors in memory for access according to said temperature reading and to determine said reduction in said stored accumulated charge.

12. A monitoring unit for monitoring the condition of charge of a battery, comprising: processor means operable during flow of charge current to said battery and discharge current from said battery for performing periodic read and processing operations, each read operation including producing a battery current reading corresponding to net current flowing to said battery, and each processing operation including producing an output reading from said battery current, and adding said output reading to a stored accumulated charge value indicating the condition of charge of said battery, said processor means being operable during inactive conditions of no flow of charge current to or discharge current from said battery for periodically performing a self-discharge correction, each self-discharge correction serving to effect a reduction in said stored accumulated charge which is a function of elapsed time while in said inactive condition and since a last preceding self-discharge correction.

13. A monitoring unit as defined in claim 12, said processor means being operable during said inactive conditions to to perform a read operation including producing a battery temperature reading, said self-discharge correction serving to effect said reduction in said stored accumulated charge as a function of said temperature reading.

14. A monitoring unit as defined in claim 13, wherein the time between said periodically performed self-discharge correction is substantially constant, said reduction in said stored accumulated charge being reduced in accordance with a temperature factor which is a function of said battery temperature reading.

15. A monitoring unit as defined in claim 14, means storing a table of temperature factors in memory for access according to said temperature reading and to determine said reduction in said stored accumulated charge.

16. A monitoring unit for monitoring the condition of charge of a battery, comprising: battery temperature sensing means, and processor means coupled to said temperature sensing means and operable during flow of charge current to said battery for performing periodic temperature read and temperature-responsive processing operations, each temperature read operation including producing a temperature reading proportional to the current temperature of said battery, each processing operation including processing of said temperature reading to obtain data for use in subsequent processing operations, storing of such data, comparing said temperature reading and data stored during prior processing operations to develop a dT/dt value indicating a rate of change of temperature with time and to determine whether said dT/dt value is changing, and generating a full charge signal after said dT/dt value is increasing and when said dT/dt value exceeds a certain threshold value.

17. A monitoring unit as defined in claim 16, said processing operations further including reducing of said threshold value as a function of a decrease in said dT/dt value.

18. A monitoring unit as defined in claim 17, said reducing of said dT/dt value being limited to prevent reduction of said dT/dt value below a certain minimum value.

19. A monitoring unit as defined in claim 17, said reducing of said threshold value being commenced only after elapse of a certain time interval following a commencement of an operation to charge said battery from a discharged condition.

20. A monitoring unit as defined in claim 16, said processing operations further include reducing of said threshold value as a function of a decrease in said dT/dt value after charging of said battery to a certain condition while preventing reduction of said dT/dt value below a certain minimum value.

21. A monitoring unit for monitoring the charge of a battery which may supply power to circuitry of a host and may be charged from a charger associated with said host, said unit comprising: sensing means for sensing the voltage of said battery and current flow to and from said battery, measuring circuitry coupled to said sensing means, processor means connected to said measuring circuitry for performing read and processing operations, each read operation including development of a battery voltage reading and battery current reading, transistor means for supplying an operating voltage to said measuring circuitry from said battery, said processor means being supplied with an operating voltage independent of that which is being supplied to said measuring circuitry, said processor means having a low power sleep condition and watch dog timer means for effecting a wake-up from said sleep condition upon elapse of a certain time interval after entering said sleep condition, and said processor means being operative upon a wake-up from said sleep condition to operate to sense a host-on condition in which said host should be in a condition in which said host circuitry or said charger may draw current from or supply current to said battery and being operative in response to sensing of said host-on condition for controlling said transistor means to supply said operating voltage to said measuring circuitry only during said on condition.

22. A monitoring unit as defined in claim 21, said processor means upon said wake-up from said sleep condition being operative to change the count registered by a counter and to sense a time-out at which a certain count has been registered by said counter, and said processor means being operative to enter said sleep condition upon sensing neither said time-out or said host-on condition.

23. A monitoring unit as defined in claim 22, said processor means being operable in response to said time-out of said counter for performing a self-discharge operation, each self-discharge operation serving to effect a reduction in a stored accumulated charge value which is a function of elapsed time while in said inactive condition and since a last preceding self-discharge operation.

24. A monitoring unit as defined in claim 23, said processor means being operable during said inactive conditions to to perform a read operation including producing a battery temperature reading, said self-discharge operations serving to effect said reduction in said stored accumulated charge as a function of said temperature reading.

25. A monitoring unit as defined in claim 24, wherein the time between said periodically performed self-discharge operations is substantially constant, said reduction in said stored accumulated charge being reduced in accordance with a temperature factor which is a function of said battery temperature reading.

26. A monitoring unit as defined in claim 25, means storing a table of temperature factors in memory for access according to said temperature reading and to determine said reduction in said stored accumulated charge.

27. A monitoring unit for monitoring the charge of a battery which may supply circuitry of a host and may be charged from a charger associated with said host, said unit comprising: memory means, processor means operative for gathering and storing in said memory means information concerning the voltage of, current flow to and temperature of said battery and its condition of charge being operative for sending data to said host under control of said host.

28. A monitoring unit as defined in claim 27 said memory means including control data determining conditions of operation of said processor means, and said processor means being operative for sending said control data to said host under host control.

29. A monitoring unit as defined in claim 28, said memory means including control data determining conditions of operation of said processor means, and said processor means being operative for receiving instructions from said host and data for revision of said control data.

30. A monitoring unit comprising: input means for supplying an input voltage to be measured, measuring means including ramp voltage generator means for generating a ramp voltage, comparator means coupled to said input means and said ramp voltage generator means, and processor means operative for controlling periodic operation of said ramp voltage generator means and coupled to said comparator means for registering digital input voltage data corresponding to a comparison of said ramp voltage with a voltage proportional to said input voltage and digital reference data corresponding to a comparison of said ramp voltage with a subtantially fixed voltage, said processor means being operative for processing said digital input voltage and reference data to develop output digital data proportional to the magnitude of said input voltage and substantially independent of changes in slope of said ramp voltage.

31. A monitoring unit as defined in claim 30, digital data storage means for storing digital calibration data developed at a calibration time and accessible by said processor means, and said processor means being operative for processing of said digital input voltage, reference and calibration data and for output of digital data which is directly proportional to said registered digital input voltage data, directly proportional to said digital calibration data and inversely proportional to said registered digital reference data, whereby to obtain in each periodic operation of said measuring means a dynamic correction for drifts in operation of said measuring means arising since said calibration time.

32. A monitoring unit as defined in claim 30, said ramp voltage generator means being operated peridically for generating a ramp voltage beginning at a starting time and changing in proportion to elapsed time since said starting time, said comparator means including first voltage comparator means for comparing said ramp voltage generated by said ramp voltage generator means and a voltage proportional to said input voltage to develop a first comparator output signal, second voltage comparator means for comparing said ramp voltage and a voltage proportional to said operating voltage to develop a second comparator output voltage, and said processor means being operative for initiating periodic operations of said ramp voltage generator means and being responsive to said first and second comparator output signals to develop said digital input voltage and reference data though counts of periodic signals from said initiating of said generating of said ramp voltage to receptions of said first and second comparator output signals.

33. A monitoring unit arranged for developing digital output data as a function of the value and polarity of an input voltage applied between an input terminal and a ground terminal, said unit comprising: power supply means for supplying an operating voltage between said ground terminal and a supply voltage terminal, a measurement voltage divider including a first resistance means having one end connected to said supply voltage terminal and an opposite end connected to a measurement node and second resistance means having one end connected to said measurement node and an opposite end connected to said input terminal, and measuring means including analog to digital converter means operative for measuring a voltage at said measurement node and including means for producing a digital output reading corresponding to the value and polarity of said voltage at said input terminal.

34. A monitoring unit as defined in claim 33 for monitoring of current and including a current sense resistor between said input and ground terminals to produce said input voltage.

35. A monitoring unit as defined in claim 33, said measuring means being operable periodically including zero input means placed in an active condition and then in an inactive condition in each periodic operation of said measuring means, said zero input means being operable in an active condition to simulate a zero input voltage condition, said measuring means being operative for producing a reading of a first value of a measurement node voltage with said zero input means in said active condition and a reading of a second value of said measurement node voltage with said zero input means in said inactive condition, and said digital output reading being a function of a difference between said first and second values of said measurement node voltage.

36. A monitoring unit as defined in claim 35 for monitoring of current and including a current sense resistor between said input and ground terminals to produce said input voltage.

37. A monitoring unit as defined in claim 36, said second resistance means being divided to provide a zeroing node and a portion between said zeroing node and said opposite end having a resistance that is small fraction of the total resistance of said second resistance means but which is substantially higher than the resistance of said current sense resistor, said zero input means being connected to said zeroing node and being operative in said active condition thereof to develop a voltage at said zeroing node which is substantially independent of measured current.

38. A monitoring unit as defined in claim 35, means providing a bridge unit which includes said measurement voltage divider and which includes a reference voltage divider, said reference voltage divider including third resistance means having one end connected to said supply voltage terminal and an opposite end connected to a reference node and fourth resistance means having one end connected to said reference node and an opposite end connected to said ground terminal, said measuring means being operative for producing a first value of a reference node voltage with said zero input means in said active condition and a second value of a reference node voltage with said zero input means in an inactive condition, said first value of said reference node voltage differing from said first value of said measurement node voltage as a function of any unbalance in said bridge circuit that is independent of said input voltage and said second value of said reference node voltage differing from said second value of said measurement node voltage as a function of any unbalance in said bridge circuit affected by said input voltage, and said digital output reading being both a function of a difference between said first and second reference values and a function of a difference between said first and second measurement values.

39. A monitoring unit as defined in claim 38 for monitoring of current and including a current sense resistor between said input and ground terminals to produce said input voltage in response to current flow through said current sense resistor.

40. A monitoring unit as defined in claim 39, said second resistance means being divided to provide a first control node and a portion between said first control node and said opposite end of said second resistance means having a resistance that is small fraction of the total resitance of said second resistance means but which substantially higher than the resistance of said current sense resistor, said fourth resistance means being divided to provide a second control node and a portion between said second control node thereof and said opposite end thereof, said zero input means being connected to said first and second control nodes and being operative in said active condition thereof to place both of said first and seond control nodes at substantially the same potential relative to ground potential.

41. A monitoring unit as defined in claim 40, said zero input means comprising transistor means connected between said first and second control nodes and rendered conductive in said active condition of said zero input means.

42. A monitoring unit as defined in claim 41, said zero input means comprising first and second control means connected to said first and second control nodes and operative in said active condition of said zero input means to provide separate low resistance paths from said first and second control nodes to said ground terminal.

43. A monitoring unit as defined in claim 41, measuring means comprising processor means having a pair of pins connected to said first and second control nodes to provide said first and second control means, each of said pins being selectively operable in either a tri-state mode or in a conductive mode to provide a low resistance path to ground, and a pair of pins pins connected to said control nodes and controllable to provide said pair of means connected to said control nodes.

44. A measuring unit comprising: ramp voltage generator means for generating a ramp voltage, a plurality of comparator means each operative for comparing said ramp voltage and an input voltage and producing an output signal which changes in state in response to a certain difference between said ramp voltage and said input voltage, and processor means coupled to said ramp voltage means and including data storage registers and a port for input of said output signals from said plurality of comparator means, said processor means being operative to perform a read operation including initiating generation of said ramp voltage and then performing periodic test operations, each test operation including effecting a one count change in current count data, registering of port data indicating the status of said output signals from said comparator means, detecting any change in data in said port data from port data registered in a last preceding test operation and responding to any such change in data by registering change data as to said change in said plural bit digital data, said change data together with said current count data providing data as to the relative magnitude of said ramp voltage and of any input voltage which produced a change in state of any one of said plurality of comparators since said last preceding test operation.

45. A measuring unit as defined in claim 44, said measurement data determining operation including storage in a mask register of plural bit data each bit corresponding to one of said comparator means, a logical operation to compare said data in said mask register with current port data and to develop said change data, and storage in said mask register of data corresponding to current port data for use in a next subsequent test operation to detect any change in port data.

46. A measuring unit as defined in claim 45, said processor means being operative to discontinue generation of said ramp voltage when said current count reaches a certain value in excess of an expected maximum value of any of said second voltage applied to said second inputs of said comparator means.

47. A measuring unit as defined in claim 46, each of said test operations including storage in temporary storage registers of said change data and corresponding current count data, and said processor means being operative after discontinuing generation of said ramp voltage to process and sort data stored in said temporary storage registers to produce a reading for each of said comparator means corresponding to a count registered in response to a change in state thereof.

* * * * *